(12) United States Patent
Tyhurst et al.

(10) Patent No.: US 8,418,168 B2
(45) Date of Patent: Apr. 9, 2013

(54) METHOD AND SYSTEM FOR PERFORMING A SOFTWARE UPGRADE ON AN ELECTRONIC DEVICE CONNECTED TO A COMPUTER

(75) Inventors: Timothy Richard Tyhurst, Kitchener (CA); Salim Hayder Omar, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1114 days.

(21) Appl. No.: 12/128,669

(22) Filed: May 29, 2008

(65) Prior Publication Data

US 2009/0300596 A1    Dec. 3, 2009

(51) Int. Cl.
*G06F 9/44*    (2006.01)
(52) U.S. Cl. .......... 717/173; 717/168; 717/170; 717/171
(58) Field of Classification Search .......... 717/168–178; 707/694; 726/1–2
See application file for complete search history.

(56) References Cited

U.S. PATENT DOCUMENTS

| | | | |
|---|---|---|---|
| 5,897,634 A * | 4/1999 | Attaluri et al. .................. | 1/1 |
| 6,638,315 B2 | 10/2003 | Uppiano et al. | |
| 6,944,859 B2 | 9/2005 | Bunger | |
| 7,085,999 B2 | 8/2006 | Maeda et al. | |
| 7,320,010 B2 | 1/2008 | Peng | |
| 7,584,225 B2 | 9/2009 | Jiang et al. | |
| 7,620,001 B2 | 11/2009 | Ganji | |
| 2002/0072355 A1 | 6/2002 | Jeong | |
| 2002/0152232 A1 | 10/2002 | Uppiano et al. | |
| 2003/0033209 A1 * | 2/2003 | Minear et al. .................. | 705/26 |
| 2003/0046017 A1 | 3/2003 | Fischer et al. | |
| 2004/0006506 A1 * | 1/2004 | Hoang ........................... | 705/10 |
| 2004/0154014 A1 | 8/2004 | Bunger | |
| 2005/0132351 A1 * | 6/2005 | Randall et al. ................. | 717/168 |
| 2005/0149940 A1 * | 7/2005 | Calinescu et al. ............. | 718/104 |

(Continued)

FOREIGN PATENT DOCUMENTS

| | | |
|---|---|---|
| EP | 1 806 654 A | 7/2007 |
| EP | 1806654 | 7/2007 |
| WO | WO 2004034687 | 4/2004 |
| WO | WO 20040034687 | 4/2004 |

OTHER PUBLICATIONS

Office Action Dated Dec. 19, 2011; U.S. Appl. No. 13/273,511, filed Oct. 14, 2011.
Extended European Search Report dated Sep. 3, 2008; EP Application No. 08157143.2.

(Continued)

*Primary Examiner* — Lewis A Bullock, Jr.
*Assistant Examiner* — Tina Huynh
(74) *Attorney, Agent, or Firm* — Ridout & Maybee LLP

(57) ABSTRACT

A method for performing a software upgrade on an electronic device connected to a computer includes displaying a web page including a scripting language within an Internet browser on the computer, the Internet browser including a scripting engine for executing the scripting language; providing a scripting-language capable device controller for interfacing communications between the scripting engine and the electronic device; receiving by the Internet browser of a request to install device software onto the electronic device via a user interface element of the web page; receiving by the device controller of device attribute information from the electronic device in response to the request; sending the device attribute information from the device controller to the scripting engine; sending the device attribute information from the Internet browser; when an upgrade is available, receiving upgrade software for the electronic device, and upgrading device software on the electronic device using the upgrade software.

12 Claims, 8 Drawing Sheets

U.S. PATENT DOCUMENTS

| | | | |
|---|---|---|---|
| 2006/0026304 A1* | 2/2006 | Price | 710/8 |
| 2006/0077940 A1 | 4/2006 | Ganji | |
| 2006/0225123 A1* | 10/2006 | Childress et al. | 726/1 |
| 2007/0004393 A1* | 1/2007 | Forsberg et al. | 455/420 |
| 2007/0067297 A1 | 3/2007 | Kublickis | |
| 2007/0100913 A1 | 5/2007 | Sumner et al. | |
| 2007/0288989 A1* | 12/2007 | Aarnos et al. | 726/1 |
| 2008/0168245 A1 | 7/2008 | De Atley et al. | |
| 2008/0168526 A1 | 7/2008 | Robbin et al. | |
| 2008/0263632 A1* | 10/2008 | Keon | 726/3 |
| 2008/0288515 A1 | 11/2008 | Kim et al. | |
| 2009/0181653 A1* | 7/2009 | Alharayeri | 455/414.1 |
| 2009/0300596 A1 | 12/2009 | Tyhurst et al. | |
| 2011/0106908 A1* | 5/2011 | Risku et al. | 709/217 |

OTHER PUBLICATIONS

Notice of Allowance dated Aug. 27, 2010; U.S. Appl. No. 12/128,693.
Office Action dated Mar. 23, 2010; U.S. Appl. No. 12/128,693.
Office Action dated Oct. 7, 2011; U.S. Appl. No. 12/128,669.
Office Action Dated Apr. 7, 2011; Canadian Application No. 2,632,510.
Summons to Attend Oral Proceedings dated Sep. 14, 2011; EP 08157143.2.
Office Action dated Mar. 29, 2012; U.S. Appl. No. 12/957,725.
Office Action dated Feb. 21, 2011; CA application No. 2,632,484.

* cited by examiner

METHOD AND SYSTEM FOR PERFORMING A SOFTWARE UPGRADE ON AN ELECTRONIC DEVICE CONNECTED TO A COMPUTER

TECHNICAL FIELD

The present disclosure relates to communications, and more particularly to a method and system for performing a software upgrade on an electronic device connected to a computer.

BACKGROUND

The device software on portable and handheld electronic devices typically requires updating from time-to-time in the same manner that computer software requires updating. Because such devices are often not directly connected to an upgrade mechanism during normal use, it may be difficult to determine if any update is available for a particular device, and to perform the update. The update process may be complicated further in the context of mobile communication devices which, although having the same or similar technical capabilities, may not be capable of receiving the same device software due to enterprise restrictions and/or carrier differences.

Thus, there exists a need to provide an improved solution for performing a software upgrade on an electronic device.

BRIEF DESCRIPTION OF THE DRAWINGS

It will be noted that throughout the drawings and description similar features are identified by the same reference numerals.

DETAILED DESCRIPTION OF EXAMPLE EMBODIMENTS

Figure 1:
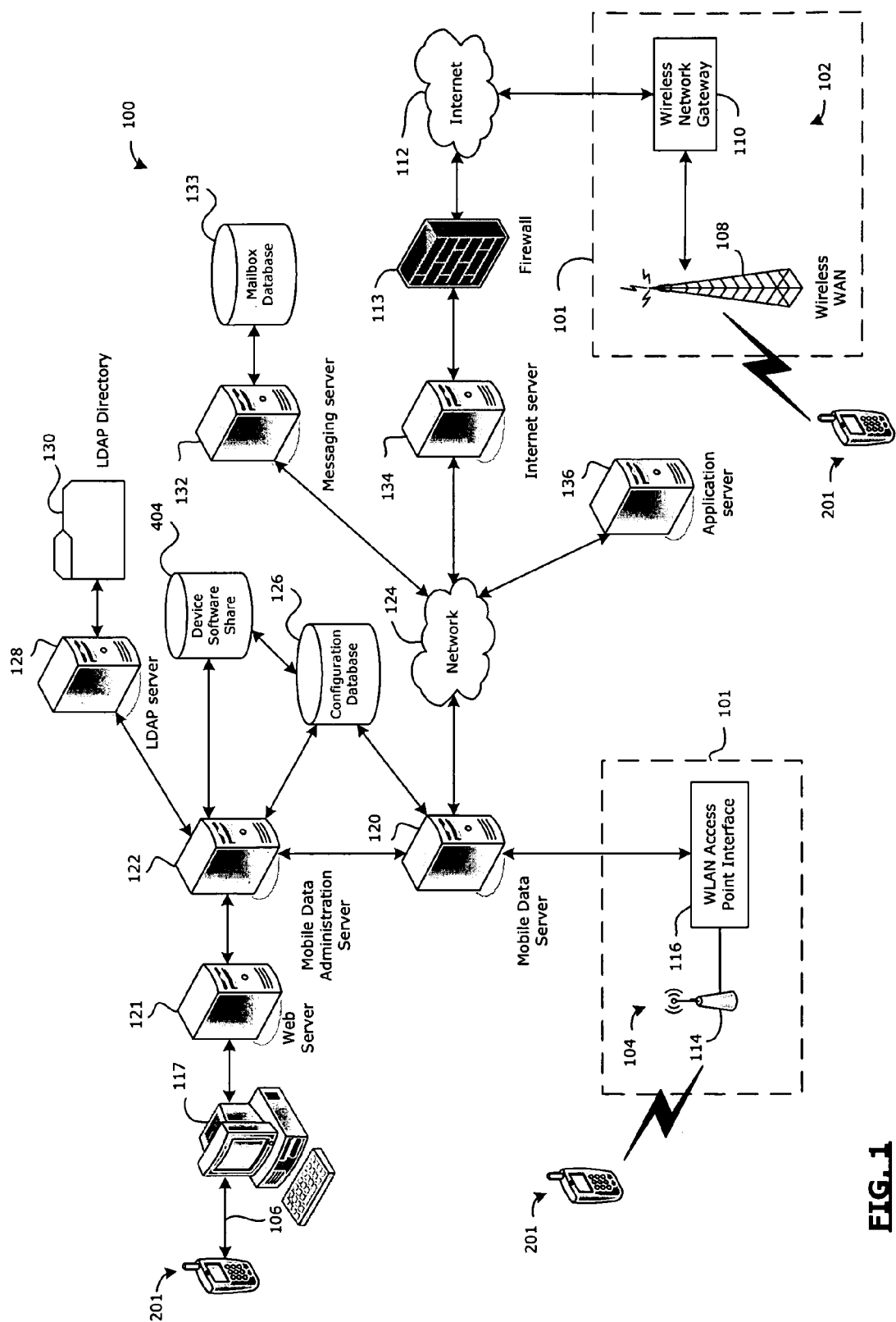
FIG. 1 is a block diagram illustrating a communication system including a mobile communication device to which example embodiments of the present disclosure can be applied.

The present disclosure describes a method and system for communicating between an Internet browser on a computer and a connected electronic device. A communications interface or adapter interfaces communications between the Internet browser on the computer and the electronic device connected to the computer. Communication components such as the communications interface and device communications stack components required by the computer for communicating with the electronic device may be provided in a trusted environment which may be accessed by the electronic devices on demand in the event that the communication components are not present or require updating. In at least some embodiments, providing the communication components in the trusted environment allows the communication components to be installed even in circumstances in which the user's authorization and/or security privileges do not normally allow the installation of communication components.

The present disclosure also describes a method and system which allows for software on electronic devices connected to a computer to be upgraded by users or administrators using a Web-based client application hosted within an Internet browser. The upgrade software for the electronic devices is automatically selected in accordance with upgrade parameters determined from the electronic devices. In some embodiments, the electronic device is a mobile communication device (such as a handheld communication device) and the upgrade software is automatically selected in accordance with upgrade parameters comprising the device model and wireless network carrier of the device. In some embodiments, the upgrade may be forced by the administrator when predetermined conditions exist. The predetermined conditions may be the availability of the upgrade, the expiry of a preset time period after the upgrade becomes available, or after a preset number of upgrade delays or bypasses after the upgrade first becomes available.

In accordance with one embodiment of the present disclosure, there is provided a method for upgrading device software on an electronic device connected to a computer through a communications protocol, the computer being connected to a central repository of device software over a communications network, the method comprising: displaying a web page including a scripting language within an Internet browser on the computer, the Internet browser including a scripting engine for executing the scripting language; providing a scripting-language capable device controller for interfacing communications between the scripting engine and the electronic device in accordance with the communications protocol connecting the computer and electronic device; receiving by the Internet browser of a request to install device software onto the electronic device via a user interface element of the web page; receiving by the scripting-language capable device controller of device attribute information from the electronic device through the communications protocol in response to the request; determining if an upgrade is available for the electronic device in accordance with the device attribute information; and when an upgrade is available, selecting upgrade software for the electronic device from the central repository in accordance with at least the device attribute information, and upgrading the software on the electronic device using the selected upgrade software using the communications protocol. Determining whether an upgrade is available is available and selecting the upgrade software for the electronic device may be performed locally on the computer.

In accordance with another embodiment of the present disclosure, there is provided a method for upgrading device software on an electronic device connected to a computer through a communications protocol, the computer being connected to a central repository of device software over a communications network, the method comprising: displaying a web page including a scripting language within an Internet browser on the computer, the Internet browser including a scripting engine for executing the scripting language; providing a scripting-language capable device controller for interfacing communications between the scripting engine and the electronic device in accordance with the communications protocol connecting the computer and electronic device; receiving by the Internet browser of a request to install device software onto the electronic device via a user interface element of the web page; receiving by the scripting-language capable device controller of device attribute information from the electronic device through the communications protocol in response to the request; sending the device attribute information from the scripting-language capable device controller to the scripting engine of the Internet browser; sending the device attribute information from the Internet browser; when an upgrade is available, receiving upgrade software for the electronic device in response to the sending the device attribute information, and upgrading device software on the electronic device using the upgrade software using the communications protocol connecting the computer and electronic device.

In accordance with a further embodiment of the present disclosure, there is provided a method for use by a server for selecting device software for installing on an electronic device connected to a computer through a communications protocol, the computer and server being connected over a communications network, the method comprising: providing a central repository of device software on a data storage element connected to the communications network, wherein the device software is stored in association with device attribute information about electronic devices to which the device software applies; receiving device attribute information about an electronic device connected to the computer; determining whether an upgrade is available for the electronic device in accordance with the device attribute information; and when an upgrade is available, selecting upgrade software for the electronic device from the device software in the central repository in accordance with at least the device attribute information, and sending the device software to the computer.

In some embodiments, the electronic device is a mobile communication device having a communications subsystem for exchanging data with a wireless communications network, the server being configured to communicate with a plurality of mobile communication devices over a wireless communications network, and wherein the device attribute information comprises a device model identifier (ID) of the mobile communication device and a wireless network carrier identifier (ID) of the wireless communications network.

In some embodiments, the method further comprises: sending a policy message to one or more of the mobile communication devices in the plurality of mobile communication devices associated with the server, the policy message including a policy rule restricting software which can be installed on the electronic device.

In some embodiments, the method further comprises: sending a policy message to one or more of the mobile communication devices in the plurality of mobile communication devices associated with the server, the policy message including a force upgrade policy rule specifying whether an upgrade is required.

In some embodiments, the force upgrade policy rule specifies a maximum number of upgrade deferrals.

In some embodiments, the policy messages are stored in memory of the mobile communication devices when received.

In accordance with a further embodiment of the present disclosure, there is provided a server for selecting device software for installing on an electronic device connected to a computer through a communications protocol, the computer and server being connected over a communications network, the server comprising: the server being connected to a central repository of device software on a data storage element connected to the communications network, wherein the device software is stored in association with device attribute information about electronic devices to which the device software applies; a module for receiving device attribute information about an electronic device connected to the computer; a module for determining whether an upgrade is available for the electronic device in accordance with the device attribute information; and means, responsive to when an upgrade is available, for selecting upgrade software for the electronic device from the device software in the central repository in accordance with at least the device attribute information, and a module for sending the device software to the computer.

System Overview

Figure 2:
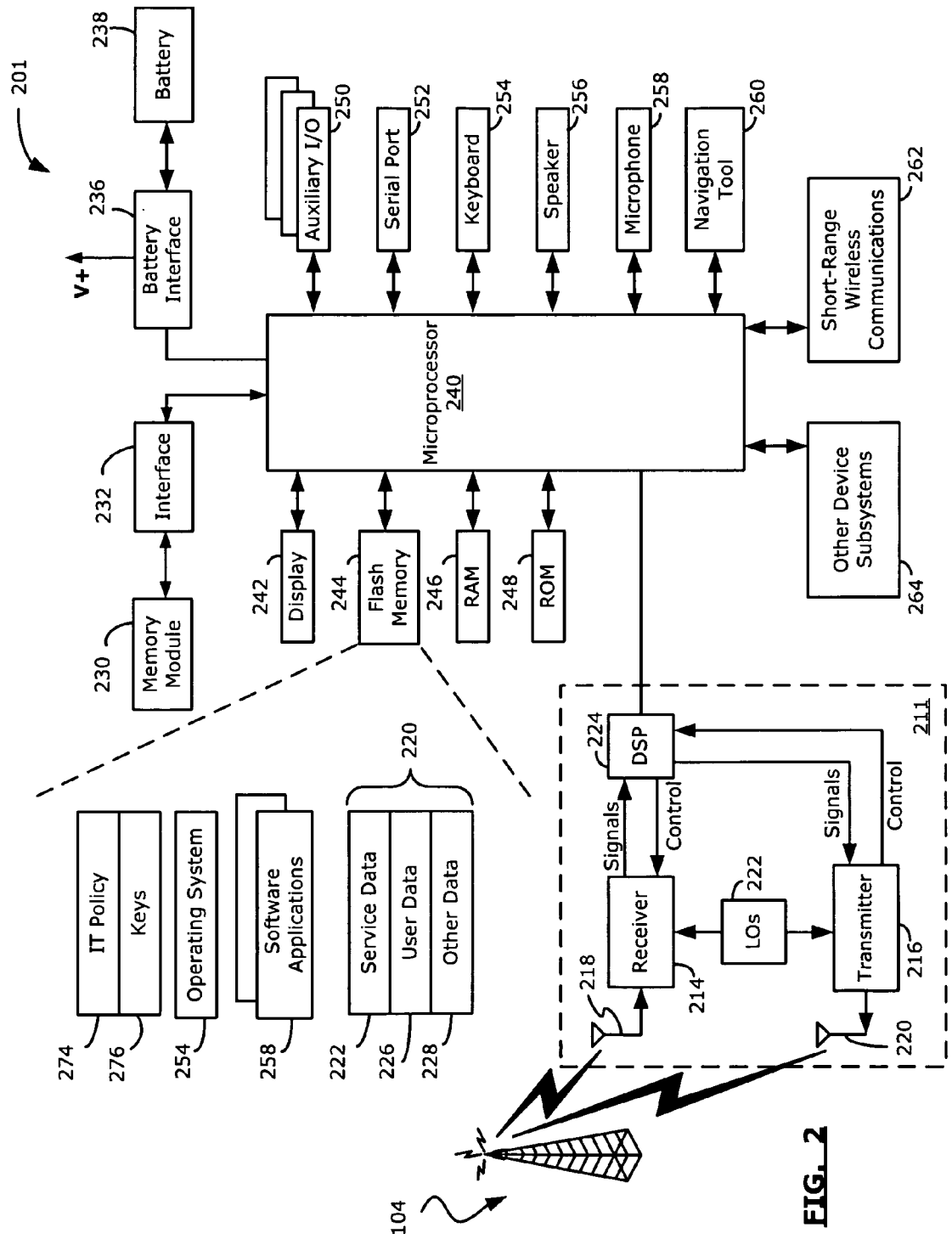
FIG. 2 is a block diagram illustrating a mobile communication device in which example embodiments of the present disclosure can be applied.

Reference is first made to FIG. 1 which shows in block diagram form a communication system 100 in which example embodiments of the present disclosure can be applied. The communication system 100 comprises a number of mobile communication devices 201 (described in greater detail in FIG. 2) which may be connected to the remainder of system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 comprises a wireless network gateway 110 which connects the mobile communication devices 201 to the Internet 112, and through the Internet 112 to a wireless connector system comprising a mobile data server 120. The mobile data server 120 may be operated by an enterprise such as a corporation which allows access to a network 124 such as an internal or enterprise network and its resources, or the mobile data server 120 may be operated by a mobile network provider. If the mobile data server 120 is operated by a mobile network service provider, the network 124 may be the Internet 112 rather than an internal or enterprise network.

The wireless network gateway 110 provides translation and routing services between the mobile data server 120 and the WWAN 102, which facilitates communication between the mobile communication devices 201 and other devices (not shown) connected, directly or indirectly, to the wireless network 101. Accordingly, communications sent via the mobile communication devices 201 are transported via the wireless network 101 to the wireless network gateway 110. The wireless gateway 110 forwards the communications to the mobile data server 120 via the Internet 112. Communications sent from the mobile data server 120 are received by the wireless network gateway 110 and transported via the wireless network 101 to the mobile communication devices 201.

The WWAN 102 may be implemented as a packet-based cellular network that includes a number of transceiver base stations 108 (one of which is shown in The WWAN 102 may be implemented using any suitable network technology. By way of example, by not limitation, the WWAN 102 may be implemented as a packet-based wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), WiMax (Worldwide Interoperability for Microwave Access), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WLAN 104 comprises a wireless network which, in some embodiments, conforms to IEEE 802.11x standards (sometimes referred to as Wi-Fi™) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which connects to the mobile data server 120 directly (for example, if the access point 114 is part of an enterprise WLAN 104 in which the mobile data server 120 resides), or indirectly via the Internet 112 if the access point 14 is a personal Wi-Fi network or Wi-Fi hotspot (in which case a mechanism for securely connecting to the mobile data server 120, such as a virtual private network (VPN), may be required). The AP interface 116 provides translation and routing services between the access points 114 and the mobile data server 120 to facilitate communication, directly or indirectly, with the mobile data server 120.

It will be appreciated that the WWAN 102 and WLAN 104 may have coverage areas that overlap, at least partially. Typically, the coverage area of the WWAN 102 will be much larger than the coverage area of the WLAN 104 and may overlap all or a large percentage of the coverage area of the WLAN 104. The WLAN 104 may have sole coverage in some regions that are dead spots in the WWAN 102. For example, some interior locations of buildings may be impenetrable to signals transmitted by the WWAN 102. Typically, the channel resources, such as bandwidth available for providing content to the mobile communication devices 201 will be greater over the WLAN 104 than over the WWAN 102.

The mobile data server 120 may be implemented as one or more server modules, and is typically located behind a firewall 113. The mobile data server 120 manages communications to and from a set of managed mobile communication devices 201 such that the mobile communication devices 201 are each enabled to exchange electronic messages and other information with each other and computers, for example via the Internet 112. The mobile data server 120 also provides administrative control and management capabilities over users and mobile communication devices 201 which may connect to the mobile data server 120.

The mobile data server 120 allows the mobile communication devices 201 to access the network 124 and connected resources and services such as a messaging server 132 (for example, a Microsoft Exchange™, IBM Lotus Domino™, or Novell GroupWise™ email server) for implementing or connecting to a messaging system, an Internet server 134 for connecting to the Internet 112 and World Wide Web (WWW), and application servers 136 for implementing server-based applications such as instant messaging (IM) applications or for accessing other servers such as content servers. The messaging server 132 maintains a user mailbox for each user of the mobile data server 120 in a mailbox database or "mailstore" 133. The Internet server 134 and/or application servers 136 may, in some operational modes, function as proxy servers for obtaining content from remote content sources such as content servers (sometimes referred to as origin servers).

The mobile data server 120 also provides a secure exchange of data (e.g., email messages, personal information manager (PIM) data, and IM data) with the mobile communication devices 201. In at least some embodiments, communications between the mobile data server 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure environment and are used for both encryption and decryption of data. In some embodiments, the private encryption key is stored on the messaging server 132 (for example, in the user's mailbox) and on the mobile communication device 201. In other embodiments, the private encryption key maintained by the mobile data server 120 is stored elsewhere. The location of the private encryption key maintained by the mobile data server 120 typically depends on the messaging server 132 which is used. The private encryption key may, in some embodiments, be regenerated by the user on mobile communication devices 201. Data sent to the mobile communication devices 201 is encrypted by the mobile data server 120 using the private encryption key retrieved from the user's mailbox or other location. The encrypted data, when received on the mobile communication devices 201, is decrypted using the private encryption key stored in memory. Similarly, data sent to the mobile data server 120 from the mobile communication devices 201 is encrypted using the private encryption key stored in the memory of the mobile communication device 201. The encrypted data, when received on the mobile data server 120, is decrypted using the private encryption key retrieved from the user's mailbox or other location.

The mobile data server 120 may also comprise an Internet connectivity module (not shown) which provides TCP/IP (transmission control protocol/Internet protocol) and HTTP (hypertext transfer protocol)-based connectivity providing an Internet based service connection. The Internet connectivity module provides the mobile communication devices 102 with access to the Internet 112 and World Wide Web (WWW) and possibly other external communication networks connected directly or indirectly to the mobile data server 120. Alternatively, in other embodiments, the Internet connectivity module may be implemented by a separate server or server application which is connected to the mobile data server 120.

The wireless network gateway 110 is adapted to send data packets received from the mobile communication device 201 over the WWAN 102 to the mobile data server 120. The mobile data server 120 then sends the data packets to the appropriate connection point such as the messaging server 132, Internet server 134, or application servers 136 where the data packets can be sent to the appropriate end point. Conversely, the mobile data server 120 sends data packets received, for example, from the messaging server 132, Internet server 134, or application server 136 to the wireless network gateway 110 which then transmit the data packets to the destination mobile communication device 201. The AP interfaces 116 of the WLAN 104 provide similar sending functions between the mobile communication device 201, the mobile data server 120 and network connection point such as the messaging server 132, Internet server 134, and application server 136.

The network 124 may comprise a private local area network, metropolitan area network, wide area network or combinations thereof and may include virtual networks constructed using any of these, alone, or in combination. A user may connect to the mobile data server 120 using a computer 117, such as desktop or notebook computer, via the network 124. If the mobile data server 120 is operated by a mobile network provider rather than an enterprise, the network 124 may be the Internet 112. If the mobile data server 120 is operated by an enterprise, there may be a number of enterprise computers 117 connected to the network 124.

IT policies can be set by an IT administrator of the network 124 by sending an appropriate IT policy message to the mobile communication devices 201 managed by the mobile data server 120. The periodic transmission of IT policy messages from the mobile data server 120 the managed mobile communication devices 201 assists in ensuring, among other things, that each of the mobile communication devices 201 is kept up to date with the latest IT policy. The content and frequency of IT policy messages may be set by the IT administrator. Private and public key pairs are typically used to authenticate the IT policy messages. The IT policy private key is stored in the mobile data server 120. The IT policy public key 276 is stored on the mobile communication device 201. The mobile data server 120 digitally signs all IT policy messages using the IT policy public key which uses the IT policy public key to authenticate the digital signature in received IT policy messages. The IT policy messages 274 and/or rules contained within the IT policy messages may be stored in the memory (e.g., flash memory 244) of the mobile communication device 201.

The mobile data server 120 is connected to a mobile data administration server 122 in a secure manner. The mobile data administration server 122 may be operated by an enterprise which operates the mobile data server 120, or the mobile data administration server 122 may be a public server accessible to non-enterprise users and enterprise users. The mobile data administration server 122 provides administrative services including administrative control and management capabilities in relation to users and mobile communication devices 201 connecting to the mobile data server 120. The mobile data administration server 122 may be implemented on the computer that hosts the mobile data server 120 or on a separate computer. Users may access the mobile data administration server 122 via a Web server 121 or Internet server using an Internet browser 310 (FIG. 3) on a computer 117, for example, using an HTTPS connection over an encrypted SSL or TLS connection. A Web-based device management application 302 may be accessed via the Internet browser 310 on the computers 117 to access the mobile data administration server 122 to perform administrative services in relation to their mobile communication devices 201. The Web-based device management application 302 is a Web-based client for end users which is described in more detail below. The mobile data administration server 122 performs authentication functions for users seeking to access the mobile data administration server 122 via the Web server 121 using the Web-based device management application 302. The Web-based device management application 302 is a Web-based client for end users which is described in more detail below. The Web server 121 acts as a front end for Web-based device management application 302. In some embodiments, Web server 121 may be a part of the mobile data administration server 122.

Enterprise deployments may have controls, for example via IT policy settings, which may be used to control whether or not enterprise users may access a public mobile data administration server 122 and/or control the functions which may be performed via a public mobile data administration server 122. For example, enterprise deployments may have controls in relation to whether or not enterprise users may perform a device software upgrade via a public mobile data administration server 122 and/or control the device software which may be loaded onto enterprise devices 201. The IT policies settings may be stored on enterprise devices 201 as noted above, for example in a secure memory area to prevent tampering by device users.

The mobile data administration server 122 and mobile data server 120 are each connected to a configuration database 126. In some embodiments, the mobile data server 120 directly communicates with the mobile data administration server 122 when needed using Remote Procedure Calls (RPC). A shared secret stored in the configuration database 126 is used to authenticate messages sent between the mobile data server 120 and mobile data administration server 122. In other embodiments, the mobile data server 120 may be connected to the mobile data administration server 122 using a secure Hypertext Transfer Protocol (HTTPS) connection over an encrypted Secure Sockets Layer (SSL) or Transport Layer Security (TLS) connection.

The configuration database 126 is directly connected, or indirectly connected by the mobile data administration server 122, to a second database containing a device software share (or store) 404. The configuration database 126 may comprise the device software share 404. The device software share 404 is typically a shared network file system rather than a relational database.

The mobile data administration server 122 is typically connected to the configuration database 126 using a secure connection which may be implemented using HTTPs, or which may be otherwise "secured" to prevent other users on the network 124 reading data sent between the mobile data administration server 122 and configuration database 126. The configuration database 126 is a relational database which contains configuration information such as user account data (such as user account profiles also known as user account records) and mobile data server connection details. In some embodiments, depending on the messaging server 132, at least a subset of the user account data from the configuration database 126 is also stored in a corresponding user-specific location in the mailbox database 133. When the messaging server 132 is a Microsoft Exchange™ at least a subset of the user account data from the configuration database 126 may be stored directly in the respective user mailbox in the mailbox database 133. When the messaging server 132 is an IBM Lotus Domino™ messaging server, at least a subset of the user account data from the configuration database 126 may be stored in a parallel location to respective user mailbox within a distributed storage system of the messaging server 132. The mobile data server 120 can access user mailboxes of the messaging server 132 in the mailbox database 133; however the mobile data administration server 122 cannot access user mailboxes directly.

In other embodiments, at least some of the functions of the mobile data administration server 122 and mobile data server 120 could be combined in a common server. In some embodiments, all functions of the mobile data administration server 122, and possibly the Web server 121, may be performed by the mobile data server 120 thereby eliminating the mobile data administration server 122 and possibly the Web server 121.

The mobile data administration server 122 and mobile data server 120 could be computers implementing one or more server applications configured for performing the processes and functions described herein. The servers 120, 122 each comprise a controller comprising at least one microprocessor for controlling its overall operation and a communication subsystem. The communication subsystem performs communication functions for directly or indirectly communicating with various connection points of the communication system 100, such as the network 124 and servers 132, 134, 136, the AP interfaces 116 of the WLAN 104, the wireless network gateway 110 of the WWAN 102, and the mobile communication devices 201. The communication subsystem comprises at least a WWAN communication subsystem (not shown) for two-way communication with the WWAN 102 and possibly a WLAN communication subsystem (not shown) for two-way communication with the WLAN 104 via the access points 116.

The servers 120, 122 may further comprise a display screen or monitor connected to the microprocessor, one or more user input devices such as a keyboard and navigation tool (such as a mouse) connected to the microprocessor for sending user input signals to the microprocessor in response to user inputs, one or more memories or electronic storage elements connected to the microprocessor such as a hard disk drive (HDD) or other non-volatile memory such as flash memory, a random access memory (RAM), a read only memory (ROM), a data port such as serial data port (for example, a Universal Serial Bus (USB) data port), and auxiliary input/output (I/O) devices. Other features of the servers 120, 122 for implementing the processes and functions described herein will be appreciated by persons ordinarily skilled in the art.

The microprocessor of the servers 120, 122 operate under stored program control and execute software modules stored in memory such as persistent memory, for example, in the HDD. The software modules comprise data and instructions which may comprise operating system software and software applications. Data necessary for performing the various functions of the servers 120, 122 are also stored on the HDD. Those skilled in the art will appreciate that the software modules or parts thereof may be temporarily loaded into volatile memory such as the RAM. The RAM is used for storing runtime data variables and other types of data or information, as will be apparent to those skilled in the art. Although specific functions are described for various types of memory, this is merely an example, and those skilled in the art will appreciate that a different assignment of functions to types of memory could also be used.

A link 106 may be provided for exchanging information between the mobile communication device 201 and a computer 117 connected to the mobile data server 120. The link 106 may comprise one or both of a physical interface and short-range wireless communication interface 106. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface is a personal area network (PAN) interface. A Personal Area Network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as Bluetooth® or IEEE 802.15.3a, also referred to as UltraWideband (UWB), or other PAN connection.

The computer 117 typically comprises a controller having at least processor (i.e., microprocessor) for controlling its operation, a communications subsystem connected to the processor for communicating with the communication system 100, a display screen or monitor connected to the processor, one or more user input devices such as a keyboard and mouse connected to the processor for sending user input signals to the processor in response to user inputs, a memory or storage elements connected to the processor such as a hard disk drive (HDD), RAM, ROM and/or other suitable memory connected to the processor, and other suitable input and output devices (not shown) as desired or required. The memory has data and instructions stored thereon for configuring the processor and computer 117. Operating system software, software applications, and data used by the processor are stored in the memory. The software and data configure the operation of the computer 117. Other features of the computer 117 for implementing the processes and functions described herein will be appreciated by persons ordinarily skilled in the art.

It will be appreciated that the above-described communication system is provided for the purpose of illustration only, and that the above-described communication system comprises one possible communication network configuration of a multitude of possible configurations for use with the mobile communication devices 201. Suitable variations of the communication system will be understood to a person of skill in the art and are intended to fall within the scope of the present disclosure.

Example Mobile Communication Device

Referring back to FIG. 2, an example mobile communication device 201 in which example embodiments described in the present disclosure can be applied will now be described in further detail. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a mobile telephone, a PDA (personal digital assistant) enabled for wireless communication or smartphone, or a computer system with a wireless modem.

The mobile communication device 201 includes a wireless communication subsystem 211 for exchanging radio frequency signals with the wireless network 101. The wireless communication subsystem 211 comprises at least one of a WAN communication subsystem for two-way communication with the WWAN 102 and a WLAN communication subsystem two-way communication with the WLAN 104 via the access points 116. The wireless communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile communication device 201 and a single antenna may be shared by both receiver and transmitter, as is known in the art. As will be apparent to those skilled in the field of communication, the particular design of the wireless communication subsystem 221 depends on the wireless network 101 in which mobile communication device 201 is intended to operate.

The mobile communication device 201 may communicate with any one of a plurality of fixed transceiver base stations 108 of the wireless network 101 within its geographic coverage area. The mobile communication device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The mobile communication device 201 includes a microprocessor 240 which controls the overall operation of the mobile communication device 201. The microprocessor 240 interacts with communication subsystem 211 which performs communication functions. The microprocessor 240 also interacts with additional device subsystems which may include but are not limited to a display device 242 which may be a liquid crystal display (LCD) screen, a flash memory 244, a random access memory (RAM) 246, a read only memory (ROM) 248, auxiliary input/output (I/O) subsystems 250, a data port 252 such as serial data port (for example, a Universal Serial Bus (USB) data port), a keyboard or keypad 254, a speaker 256, microphone 258, a navigation tool 260 such as a clickable scroll wheel (also referred to as a track wheel or thumbwheel) or trackball, a short-range communication subsystem 262, and other device subsystems generally designated as 264. Different numbers and combinations of the aforementioned device subsystems may be present in various embodiments, and not all need be present in some embodiments. The keypad 254 maybe either a complete alphanumeric keypad, a limited, reduced, or simplified alphanumeric keypad, or a telephone-type keypad. In some embodiments, the mobile communication device 201 may comprise a touch-screen display which, in at least some embodiments, includes a touch-sensitive input surface which overlays the display device 242. In such embodiments, the keypad 254 may be omitted, and possibly the navigation tool 260 may be realized using the touch-sensitive input surface.

The microprocessor 240 operates under stored program control and executes software modules 220 stored in memory such as persistent memory, for example, in the flash memory 244. The software modules 220 comprise operating system software 254 and software applications 258. Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely an example, and those skilled in the art will appreciate that a different assignment of functions to types of memory could also be used.

The software applications 258 may include a range of applications, including, for example, an address book application, a messaging application, a calendar application, and/or a notepad application. In some embodiments, the software applications 258 includes one or more of a Web browser application (i.e., for a Web-enabled mobile communication device), an email message application, a push content viewing application, a voice communication (i.e. telephony) application, a map application, and a media player application. Each of the software applications 258 may include layout information defining the placement of particular fields and graphic elements (e.g. text fields, input fields, icons, etc.) in the user interface (i.e. the display device 242) according to the application.

The mobile communication device 201 stores data 220 in an erasable persistent memory, which in one example embodiment is the flash memory 244. In various embodiments, the data 220 includes service data 222 comprising information required by the mobile communication device 201 to establish and maintain communication with the wireless communication network 101 (wireless network service data) and the wireless gateway 110 (gateway service data). The data 220 may also include user application data 226 such as email messages, address book and contact information, calendar and schedule information, notepad documents, image files, and other commonly stored user information stored on the mobile communication device 201 by its user, or other data 228. The data 220 may also include data required for the communication layers managed by the mobile data server 120 and servers 132, 134, 136. The data 220 may include critical data that the user of mobile communication device 201 or the user's associated enterprise does not want to be accessed by an unauthorized party. Some of the data 220 may be stored on the memory card 230. The data 220 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

In some embodiments, the auxiliary input/output (I/O) subsystems 250 may comprise an external communication link or interface, for example, a Global Positioning System (GPS) communication subsystem for communicating with a satellite network (not shown) for navigation or other functionality, an Ethernet interface, or wireless communication interfaces for communicating with other types of wireless networks such as, for example, an orthogonal frequency division multiplexed (OFDM) network.

The serial data port 252 may be used in handheld communication devices such as smartphones for synchronization with the user's computer 117 and may be used to implement link 106 (FIG. 1) The serial data port 252 may allow a user to set preferences on the device 201 using the computer 117 and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some embodiments, the mobile communication device 201 also includes a removable memory card 230 (typically comprising flash memory) and a memory card interface 232. Network access to the WWAN 102, and possibly the WLAN 104, is typically associated with a subscriber or user of the mobile communication device 201 via the memory card 230, which may be a Subscriber Identity Module (SIM) card or other type of memory card for use in the relevant wireless network type. The memory card 130 is inserted in or connected to the memory card interface 232 of the mobile communication device 201 in order to operate in conjunction with the wireless network 101.

The mobile communication device 201 also includes a battery 238 as a power source, which is typically one or more rechargeable batteries that may be charged, for example, through charging circuitry connected to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is connected to a regulator (not shown) which provides power V+ to the circuitry of the mobile communication device 201.

The short-range communication subsystem 262 is an optional component which provides for communication between the mobile communication device 201 and different systems or devices, which need not necessarily be similar devices. The subsystem 262 may include an infrared device and associated circuits and components, or a wireless bus protocol compliant communication mechanism such as a Bluetooth® communication module to provide for communication with similarly-enabled systems and devices (Bluetooth® is a registered trademark of Bluetooth SIG, Inc.).

A predetermined set of applications that control basic device operations, including data and possibly voice communication applications will normally be installed on the mobile communication device 201 during or after manufacture. Additional applications and/or upgrades to the operating system 254 or software applications 258 may also be loaded onto the mobile communication device 201 through the wireless network 101, the auxiliary I/O subsystem 250, the serial data port 252, the short-range communication subsystem 262, or other suitable subsystem 264 other wireless communication interfaces. The downloaded programs or code modules may be permanently installed, for example, written into the program memory (i.e. the flash memory 244), or written into and executed from the RAM 246 for execution by the microprocessor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may include a personal information manager (PIM) application having the ability to organize and manage data items relating to a user such as, but not limited to, instant messaging, email, calendar events, voice mails, appointments, and task items. The PIM application has the ability to send and receive data items via the wireless network 101. In some example embodiments, PIM data items are seamlessly combined, synchronized, and upgraded via the wireless network 101, with the user's corresponding data items stored and/or associated with the user's computer 117, thereby creating a mirrored host computer on the mobile communication device 201 with respect to these data items.

The mobile communication device 201 may provide two principal modes of communication: a data communication mode and an optional voice communication mode. In the data communication mode, a received data signal such as a text message, an email message, or Web page download will be processed by the communication subsystem 211 and input to the microprocessor 240 for further processing. For example, a downloaded Web page may be further processed by a browser application or an email message may be processed by an email message application and output to the display 242. A user of the mobile communication device 201 may also compose data items, such as email messages, for example, using the keypad 254 and/or the navigation tool 260 in conjunction with the display 242 and possibly the auxiliary I/O device 250. The keypad 254 maybe either a complete alphanumeric keypad or telephone-type keypad. These composed items may be transmitted through the communication subsystem 211 over the wireless network 101.

Web-Based Device Management Application

Figure 3:
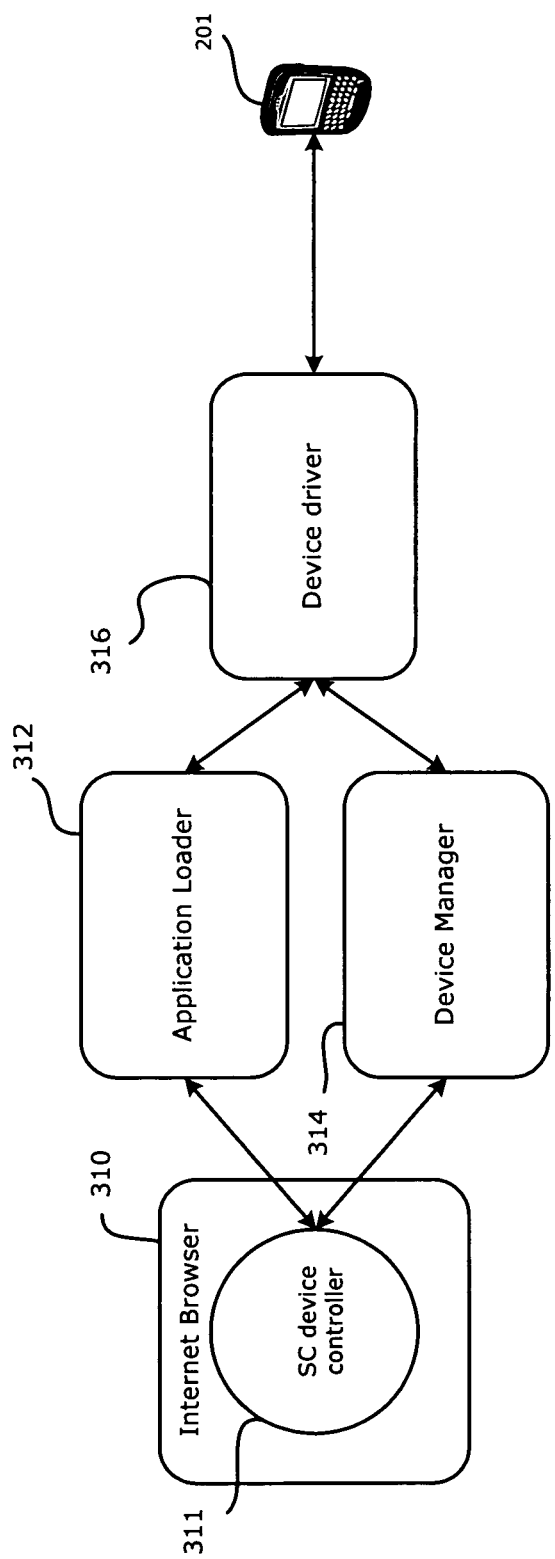
FIG. 3 is a block diagram illustrating the device communications infrastructure utilized by a Web-based device management application on a computer in accordance with one embodiment of the present disclosure.
Figure 4:
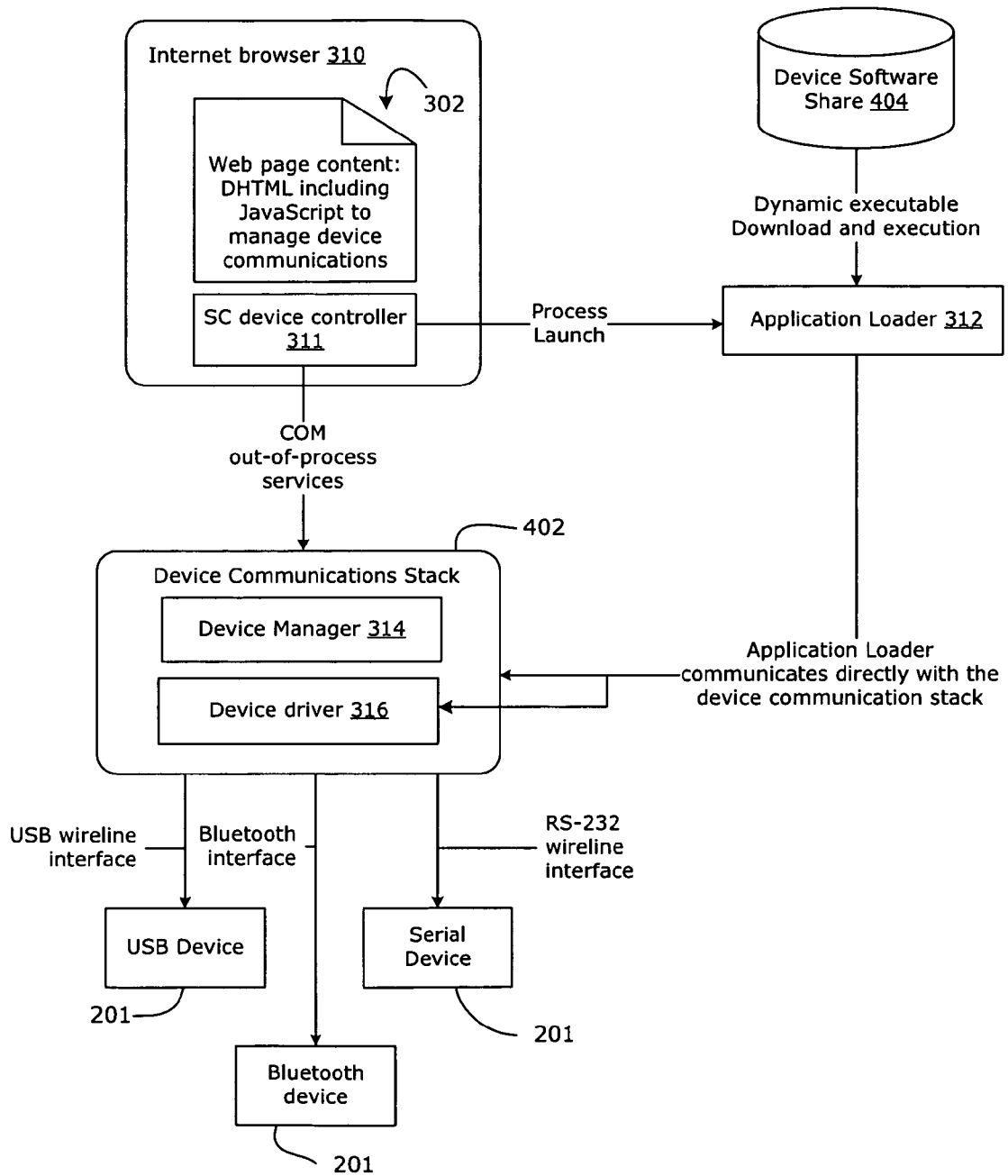
FIG. 4 is a schematic diagram illustrating the device communications infrastructure of FIG. 3 in further detail.

Referring now to FIGS. 3 and 4, a Web-based device management application 302 in accordance with one embodiment of the present disclosure will now be described. The Web-based device management application 302 is a Web-based client interface which allows users to manage and configure their mobile communication devices 201 to receive messages. The Web-based device management application 302 works in conjunction with the mobile data administration server 122. The mobile data administration server 122 is the server side component which processes and manages server side Web-based device management application 302 tasks. The Web-based device management application 302 provides users with the ability to perform a controlled set of self-serve operations that cannot be readily performed on the mobile communication device 201 alone. Depending on the embodiment, the Web-based device management application 302 allows device users to: (i) activate their device; (ii) upgrade device software; (iii) install third party applications; (iv) backup and restore device data; (v) configure device settings; (vi) obtain and review device service information; (vii) create activation passwords; (viii) connect a device via USB and manage more than one device concurrently; and/or (ix) obtain and review device service statistics.

The Web-based device management application 302 also provides administrators with an additional way to deploy and manage mobile communication devices 201 such as enterprise devices including, in at least some embodiments, the ability to upgrade client software on the mobile communication devices 201. The Web-based device management application 302 also provides administrators with the ability to enable/disable device user features, and customize the device user web interface, for example, to include a company logo or change text font colours. The Web-based device management application 302 may be accessed from most, if not any, computer having an Internet connection and any necessary communication component installed (i.e., any communication interfaces and device communication stack components), and is conveniently accessible for both users and administrators.

The Web-based device management application 302 may be advantageous for organizations that prefer not to deploy client-based software on some or all of the computers of their mobile device users. The Web-based device management application 302 may also assist in reducing the total cost of ownership for organizations by reducing the overhead costs associated with deploying, supporting and maintaining client software on the mobile communication devices 201 and supporting software on the device users' computers 117.

The supporting software on user computers 117 typically requires periodic upgrading. This may be complicated in an enterprise environment since users may not be technically capable of upgrading the software themselves or may not have the security privileges required to perform an upgrade. Typically, the operation of performing a software upgrade in an enterprise environment is restricted to administrators. Therefore, software upgrades typically require administrators to perform the upgrade on each computer 117. This is time consuming and complicated by the possibility that a computer 117 may not be accessible when the administrator seeks to upgrade the computer, for example, because the computer 117 is a notebook computer which has been removed by the user or because the computer 117 has been locked by user. The Web-based device management application 302 obviates the need to deploy or upgrade supporting thick client software on the device users' enterprise computers 117. The Web-based device management application 302, as a web application, can be updated as needed by the administrator or other party without the need to update local client software. The next time a device user accesses the Web-based device management application 302, the user automatically accesses the updated web application. This mitigates some of the overhead in supporting the software on the device users' enterprise computers. In some cases, new or upgraded communication components may need to be installed on the computer 117, however this poses only a minimal burden on device users and may be largely automated.

Typically, device software on the mobile communication devices 201, such as the operating system and/or application software, also requires periodic updating or upgrading. This may be problematic in that users may not be technically capable of upgrading the software themselves. In some cases, the device software may be bundled based on the device model and wireless network carrier or other parameters. Many users are not aware of the model of their mobile communication devices 201, and some may not know their wireless network carrier (for example, because the user's employer is billed directly by the wireless network carrier). As a result, users may not have enough information to select the correct bundle for the device software upgrade. Even if the users know the required information to select the correct bundle, it is often difficult for users to locate the correct bundle for the upgrade, for example, from the wireless network carrier or device manufacturer's website. In addition, users may not know when a device software upgrade is available. The result of the above is that often device software is not upgraded, thereby resulting in reduced performance of the mobile communication devices 201 and limited functionality over that which may be obtained if a device software upgrade were performed. The Web-based device management application 302, in some embodiments, provides a solution for automatically upgrading the device software after an upgrade becomes available with minimal intervention by the administrator or device user.

Referring again to FIGS. 3 and 4, the communications infrastructure utilized by the Web-based device management application 302 to communicate with the mobile communication device 201 in accordance with one embodiment of the present disclosure will now be described. The Web-based device management application 302 is implemented in Dynamic HTML (Hypertext Markup Language) (DHTML) via a series of web page(s) displayed in an Internet browser 310 running on the computer 117. The DHTML of the web page(s) is provided by markup document(s) written in DHTML which are retrieved by an HTTP server or Internet server in response to a direct or indirect request from the computer 117 (e.g. by an HTTP request to access or "Go" to a respective URL or web address). The Internet browser 310 communicates with a mobile communication device 201 via a device manager 314 and optionally an Application Loader 312. The Application Loader 312 is a program or program module which loads device software onto a mobile communication device 201. While the Application Loader 312 may be executed when connecting to the computer 117 via Bluetooth in some embodiments, the user should be cautioned about leaving the Bluetooth coverage area while a load (upgrade, etc.) is in progress or the device may be left in an un-useable state. A local backup of device software may be made and stored in the device memory prior to a load operation to more quickly restore functionality of the device should the load be interrupted, for example by removing the device from the Bluetooth® coverage area or due to a loss of Bluetooth connectivity (for example, due to a power loss on the computer 117). In such cases, the processor 240 is configured such that if the load is interrupted, it will restore the old device software from local memory. In other embodiments, the Web-based device management application 302 may connect via Bluetooth for the purposes of backup/restore, and device activation, however if the user attempts to perform a loading operation when connecting via Bluetooth only, the user is prompted to connect with a USB cable.

The Application Loader 312 and device manager 314 in turn communicate with connected mobile communication devices 201 via device drivers 316 for a USB device (USB device driver), a serial device (serial device driver), or Bluetooth device (Bluetooth device driver) or other similar PAN-connectable device. A USB Device is a device that uses USB as the physical transport layer for wireline communications with the computer. USB devices are connected to a USB port on the user's computer 117 or a USB hub that is connected to a USB port on the computer 117. A serial device is a device that uses RS-232 (Recommended Standard-232) serial communications as the physical transport layer for wireline communications with the computer. Serial devices are connected to a serial port on the computer 117, typically through a "cradle" accessory. USB device drivers are installed in the operating system of the computer 117 in order to enable wireline communications to a USB device. Serial device drivers are installed in the operating system of the computer 117 in order to enable wireline communications to a serial device. Typically, serial device drivers are provided with the operating system of the computer 117 and need not be installed by the Web-based device management application 302.

The device manager 314 is a program or program module which manages application-level wireline access to connected mobile devices 201, and/or possibly Bluetooth or other short-range wireless access to connected mobile devices 201. The device manager 314 provides a service routing application programming interface (API) which provides applications such as the Web-based device management application 302 with the ability to route traffic through the serial data connection (for example, USB) or Bluetooth® connection to the computer 117 using standard connectivity protocols. When a user connects their mobile communication device 201 to the computer 117 via a USB cable, the mobile data server 120 automatically routes traffic that was destined for the wireless network 101 to mobile communication device 201 over the network 124 and through the mobile data administration server 122 using the USB cable connecting the mobile communication device 201 to the computer 117. Similarly, any traffic destined for the wireless network 101 will be automatically sent over the USB cable to the mobile data server 120 for processing. This is sometimes referred to as least cost routing. In some embodiments, the user has the ability to automatically route traffic over a Bluetooth® connection to their computer 117 rather than relying on USB connectivity. All traffic to and from the mobile communication device 201 is routed over the network 124 (which may be, for example, a wired network), saving the user from utilizing additional bandwidth from their wireless service provider. When least cost routing is used on the mobile communication device 201, it is performed automatically by the low-level protocol layers and does not require any changes to an application for it to utilize this capability. When connected via a Bluetooth® connection, the computer software generally handles a Bluetooth® connection like a wireline connection.

The device manager 314 also provides a number of device related communication services in addition to serial and Bluetooth® data bypass connection functionality. The communication services provided to the Web-based device management application 302 by the device manager 314 include the notification of device attach and detach events, tracking of serial bypass/Bluetooth® statistics, and device communications multiplexing.

The Internet browser 310 is equipped with a scripting engine to run client-side scripts, such as a JavaScript scripting engine for running JavaScript, within the DHTML web page (s) of the Web-based device management application 302. As will be appreciated by persons skilled in the art, JavaScript is a scripting language used in client-side web document, for example, in web pages. The DHTML web pages include JavaScript code (scripts) which interact with the Document Object Model (DOM) of the DHTML web pages. The JavaScript engine of the Internet browser 310 (also known as JavaScript interpreter or JavaScript implementation) is an interpreter that interprets JavaScript scripts embedded in or included from DHTML pages and executes the scripts accordingly. The Internet browser 310 provides a runtime environment for the JavaScript engine and typically uses the public API (application programming interface) to create objects and methods through which the JavaScript scripts can interact with external processes and devices. Within the JavaScript runtime environment, objects and data may be shared between the JavaScript engine and the other components of the Internet browser 310. In other embodiments, other scripting languages may be used such as, for example, Visual Basic for Applications (VBA), VBScript, and Visual Basic .NET all from Microsoft Corporation.

The Internet browser 310 may be Internet Explorer™ by Microsoft Corporation, FireFox™ by Mozilla Corporation, or any other Internet browser having the necessary capabilities for implementing the functions described herein. In one example embodiment, the computer 117 runs a Windows™ operating system (by Microsoft Corporation) version Windows 2000 or later, and the Internet browser 310 is Internet Explorer™ version 5.5 or later.

As will be appreciated by persons skilled in the art, dynamic HTML is a collection of technologies used to create interactive and animated web sites by using a combination: a static markup language (such as HTML), a client-side scripting language (such as JavaScript), a presentation definition language (such as Cascading Style Sheets (CSS)), and the Document Object Model. An DHTML web page is any web page in which client-side scripting changes variables of the presentation definition language, which in turn affects the appearance and function of otherwise "static" HTML page content after the page has been fully loaded and during the viewing process. Thus, an DHTML web page is "dynamic" in that its contents and function changes while the web page is being viewed, not in its ability to generate a unique web page with each page load. This is in contrast to the broader concept of a "dynamic web page" which is any web page generated differently for each user, load occurrence, or specific variable values. This includes web pages created by client-side or server-side scripting where the content is determined prior to being viewed within the Internet browser 310. Dynamic web pages lack the ability to affect contents or function changes while a web page is being viewed.

To implement some of the functionality of the Web-based device management application 302, the Internet browser 310 needs to communicate with the connected mobile communication devices 201 and have native communication with the connected mobile communication devices 201. In some embodiments, only one device may be managed by the Web-based device management application 302 at a time. Typically, the Web-based device management application 302 will ask the user to select a device to be managed if more than one device is connected to the computer 117 (via USB or Bluetooth®), and will typically ask the user to provide a device password which secures at least some of the data 220 on the mobile communication devices 201 from being accessed by the Web-based device management application 302 without the device password being supplied by the device user. This may occur during login to the Web-based device management application 302, or after login if a second or further device is connected to the computer 117. The Web-based device management application 302 will request an identifier such as a personal identification number (PIN) of the connected device to be managed by the Web-based device management application 302. Typically, the Web-based device management application 302 will maintain this selection as the currently managed device until the user specifies that a different connected device is to be managed or the connected devices change. The PIN of the connected device may be a globally unique number of the device that identifies it to the device manufacturer and/or between device manufacturers. Other identifiers may be used instead of the PIN such as the device model number or name, International Mobile Equipment Identity (IMEI) for GSM and UMTS devices, International Mobile Subscriber Identity (IMSI) for GSM and UMTS devices, a globally unique identifier (GUID) which uniquely identifies the connected device in all wireless networks around the world, or an electronic serial number (ESN) associated with the connected device which uniquely identifies the connected device within a particular wireless network (i.e., its "home" network).

Alternatively, in other embodiments the Web-based device management application 302 may concurrently manage more than one device. In such embodiments, the user provides the Web-based device management application 302 with an identifier of the connected device to which the requested function should be applied.

The Internet browser 310 uses a Scripting-language Capable/Compatible (SC) device controller 311 to interface the JavaScript engine of the Internet browser 310 with the device communications stack 402 (the device manager 314 and device driver 316) of the mobile communication device 201. The SC device controller 311 is a device controller which is compatible with and which provides communications services to a scripting engine of an Internet browser. In particular, in the present embodiment the SC device controller 311 provides communications services to the JavaScript layer of the DHTML web page(s) comprising: notifying of device attach and detach events; sending and receiving data to connected devices; and invoking the Application Loader 312. Any other communications services which require native control by the JavaScript layer of the DHTML web page(s) may be performed by the SC device controller 311 such as migrating settings or invoking a device manager user interface. In terms of operations related to device communications, the SC device controller 311 may be used to provide communications services to the JavaScript layer of the DHTML web page(s) for responding to password challenges from the mobile communication device 201. In such cases, the device issues a callback to the JavaScript layer so that a password prompt is placed inline within the browser page content. Alternatively, password challenges may be handled by the SC device controller 311 itself without using a callback to the JavaScript layer.

In some embodiments, for example embodiments in which the Internet browser 310 is Internet Explorer™, the SC device controller 311 is implemented using one or more ActiveX Controls. ActiveX controls are a Microsoft™ COM (Component Object Model)-based technology for extending the functionality of Internet browsers with third party native code extensions. In other embodiments, for example embodiments in which the Internet browser 310 does not support ActiveX controls (such as, for example FireFox™), the SC device controller 311 is a browser "plug-in" used to extend the functionality of the Internet browser 310 in an analogous manner to an ActiveX control.

The SC device controller 311 provides the DHTML web page content hosted in the Internet browser 310 with a mechanism to interact with the mobile communication devices 201 connected to the computer 117. The SC device controller 311 (e.g., ActiveX control) is instantiated within the Internet browser 310 process, which exposes COM interfaces to permit the JavaScript scripting engine of the Internet browser 310 to interact with the connected devices and to perform other client side operations using native code.

Although the device drivers 316 and device manager 314 have been described as separate communication components within the device communications stack 402 of the mobile communication device 201, it will be appreciated by persons skilled in the art that the functions implemented by these communication components may be combined within a single communication component in other embodiments, and possibly combined with the SC device controller 311 in some embodiments. Furthermore, some or all of the functionality provided by Application Loader 312 could be bundled with the device drivers 316 and possibly the device manager 314. In some embodiments, the functionality of Application Loader 312 and device manager 314 may be provided by a single ActiveX control or browser plug-in or other SC device controller 311.

The installation of the device manager 314, the device drivers 316, and/or the SC device controller 311 may require the privileges of local administrators on the computer 117, for example, due to security restrictions in enterprise environment. To avoid having administrators install these communication components or granting users the privileges of a local administrator (even if only briefly), a Lightweight Directory Access Protocol (LDAP) directory service may be implemented to provide the Web-based device management application 302 with access to the device manager 314, device drivers 316, and/or SC device controller 311 within a secure environment.

In at least some embodiments, the mobile data administration server 122 is connected to an LDAP (domain controller) server 128 that hosts an LDAP directory service. The communication components comprising the device manager 314, the device drivers 316, and/or the SC device controller 311 may be stored within the device software share 404. An LDAP directory 130 identified by a distinguished name (DN) which has been designated as a trusted authority stores location information about where the communication components are located. The location information may comprise a pointer to the actual file location in the device software share 404, the version number of the communication components in the location, and metadata or summary data about the communication components or bundle of the communication components (if managed in terms of bundles) in the location such as the COM (Component Object Model) information about the communication components (if applicable). The administrator then creates a network policy rule (such as a Windows™ group policy) instructing computers 117 to automatically install one or more of the communication components from the location in device software share 404 specified in the LDAP directory 130 if the communication components are not installed on the computers 117 or are out of date. This allows the communication components to be installed on demand, as required. The connections between the mobile data administration server 122 and LDAP server 128 are protected, for example, using the Transport Layer Security (TLS) security protocol or the Digest Authentication Mechanism (i.e., using DIGEST-MD5 Simple Authentication and Security Layer (SASL) authentication mechanism).

The LDAP service provides a hierarchical framework of objects comprising resources (e.g. data, printers), services (e.g. email), and users (user accounts and groups). The LDAP service provides information on the objects, organizes the objects, controls access and sets security. Each object represents a single entity and its attributes. Some objects can be containers of other objects. The framework is organized as a hierarchy of domains linked in a trust hierarchy. Typically, domains are identified by a domain name system (DNS) name structure. The objects held within a domain are typically grouped into containers called organizational units (OUs) to provide the domain with a hierarchy. The OU is the common level at which to apply group policies and are objects called group policy objects (GPOs), however group policies can be applied on individual objects or attributes.

The administrator may add user account information to the LDAP directory 130 for all user accounts which are to have access to the Web-based device management application 302. After the user logs in to the Web-based device management application 302, for example, using their messaging server 132 credentials, user information about the user is used to search user entries in the LDAP directory 130 to resolve group policy rules created by the administrator. The operating system increases/escalates the privileges of the user as (if) required so that communication components may be installed on the computer 117 if needed. Typically, the user information used to resolve the group policy rule comprises or is derived from the user credentials (e.g., user name and password) used to log in to the computer 117 (i.e., the Windows™ or other operating system credentials). However, different user credentials may be used.

As noted above, after the privileges of the user have been increased/escalated as (if) required, if one or more of the communication components are not installed on the computers 117 or are out of date, the missing communication components are installed from the location in the device software share 404 specified by the LDAP directory 130 in accordance with the policy rule (e.g., group policy) created by the administrator. Any serial device drivers are provided with the operating system of the computer 117 and need not be installed, thus typically only the SC device controller 311, device manager 314, and USB device drivers 316 need to be installed by the Web-based device management application 302 if they are missing or out of date. In some embodiments, the group policy is a registry-based group policy which relies upon a registration key being installed on the computer 117 in order to apply the group policy. Methods for implement registry-based group policies are known and will not be described herein.

In one embodiment, the LDAP server 128 is implemented using the Active Directory™ directory service provided by Microsoft Corporation, for example, as part of a Microsoft® Windows Server® environment. Active Directory™ is an LDAP directory service implementation that provides a multi-purpose directory service with centralized authentication and authorization which allows administrators to assign group policies, deploy software, and apply upgrades to the entire network 124. Using Active Directory™ information and settings relating to the network users and/or enterprise are stored in a central, organized, accessible database. Active Directory™ creates a link between user accounts, user mailboxes, and applications, thereby simplifying the task of adding, modifying, and deleting user accounts. An administrator may add, change or delete a single user account and have the change affected in all applications or services connected to the Active Directory™ that the user has access to.

While a specific implementation has been described, it will be appreciated that other techniques for publishing the communication components within a trusted environment for installation on computers 117 may be used, for example, if the communication components are not installed or are out of date. For example, a directory or file lookup service may be used rather than an LDAP directory service. The LDAP server 128 is replaced with a file server providing the directory lookup service.

An embodiment in which a directory lookup service is used to install communication components will now be briefly described. In the first step, the identity of the user is determined, for example, by confirming user credentials such as a user name and password or other information provided by the user against information stored in the configuration database 126. Next, the directory lookup service determines the location of the communication components in the device software share 404. Typically, this determination is based on information stored in the same location as the information used to confirm the identity of the user, for example in the configuration database 126; however it may be located elsewhere. Next, the Web-based device management application 302 determines if any of the communication components on the computer 117 are missing or out of date. To determine if communication components on the computer 117 are out of date, the version of the communication components on the computer 117 is compared to the version of the communication components stored in the device software share 404.

If any of the communication components on the computer 117 are missing or out of date, the file server determines whether the user is authorized to download/install the communication components (for example, by comparing the user information against database records in the configuration database 126 or elsewhere). If the user is authorized to install the communication components but does not have the necessary local privileges, the user privileges are escalated (increased) to a level sufficient to install the communication components (for example, to that of a local administrator). Next, the directory lookup service retrieves and downloads the missing or out of date communication components to the computer 117. Next, the downloaded communication components are installed on the computer 117. If the user privileges where escalated to install the communication components, the user privileges are returned to the previous state (de-escalated) and the operations end. It will be appreciated the above-described process is performed automatically and invisibly to the user, i.e., the user does not know that their user privileges have been escalated. Furthermore, user privileges are only escalated if communication components need to be installed because they are missing or require upgrading, and are automatically de-escalated after the installation of the communication components.

Device Software Loading and Upgrading

Referring again to FIG. 4, the Application Loader 312 will be described in more detail. The Web-based device management application 302 interacts with the Application Loader 312 which performs device software loads and upgrades using device software stored in the device software share 404 (FIG. 1). The Application Loader 312 may access the device software share 404 via the mobile data administration server 122. As noted above, the configuration database 126 may comprise the device software share 404. In some embodiments, the device software share 404 may be shared with a wireless deployment system (not shown) for pushing device software wirelessly (over-the-air or "OTA") to the mobile communication devices 201. The device software share 404 is typically shared within the network 124 and so available to all users. Alternatively, the Application Loader 312 may access a remote device software share using an HTTP or FTP (file transfer protocol) server.

The device software share 404 stores a repository of device software. The device software in the central repository may comprise one or any combination of: platform software, device operating system software, applications, language support modules for the device operating system, components of any of the foregoing, and patches or fixes for the mobile communication devices 201. The device software may be bundled or unbundled. The bundles may comprise device software for the mobile communication devices 201 including device operating system software which comprises a graphical user interface (GUI) for controlling the operation of the mobile communication device 201, an application bundle of application software for providing applications on the mobile communication device 201 (such as Java™ based applications), or both. The bundles may also comprise communication components for the computer 117 (e.g., the device manager 314, the device drivers 316, and/or the SC device controller 311).

As will be appreciated by persons skilled in the art, in at least some embodiments each mobile communication device has stored in memory, for example in flash memory 244, a binary image of (1) the platform software comprising the device OS, radio code and Java Virtual Machine (JVM) in native code, and Java .cod files, and (2) the application software. Each platform version is a specific combination of device OS, radio code and JVM versions, with associated Java .cod files. Mobile network service providers (also referred to as wireless network carriers) typically certify each platform version before it can be released for use on mobile communication devices 201 in the wireless networks of respective mobile network service providers. Similarly, mobile network service providers typically certify each application version of the device applications before it can be released for use on mobile communication devices 201 in the wireless networks of respective mobile network service providers. The device applications may be one or more of a Web browser application, an email messaging or PIM application, a push content viewing application, a mapping application, and a media player application. The device software in the central repository may comprise device software bundles comprising: a device operating system software which comprises a graphical user interface (GUI) for controlling the operation of the mobile communication device 201, radio code which configures a radio frequency (RF) based wireless communication system of the mobile communication device 201, and a Java Virtual Machine (JVM) for executing Java applications; and application software for providing applications on the mobile communication device 201.

Device software for mobile communication devices 201, such as operating system software and applications, may be bundled based on device attribute information of devices on which the device software may be loaded onto such as, for example, a device model identifier (ID) and wireless network carrier identifier (ID). Alternatively, device software device may be bundled based on other attribute information. A bundle may be a specific combination of device software comprising a specific platform version and a specific application version. The same platform version may be combined (bundled) with different application versions to form different device software bundles. Similarly, the same application version may be combined (bundled) with platform versions to form different device software bundles.

Bundles may alternatively or additionally be based on language(s) supported and/or applications within the bundle. Different bundles may have different third party applications, or in some cases no third party applications. For example, some bundles may have social networking client software such as a Facebook™ client for connecting to a social networking server, while other bundles may not.

Bundle information is maintained about the plurality of device software bundles in the repository. The bundle information comprises device attribute information of devices on which the device software may be loaded onto, and content information about the contents of the bundle. If a bundle contains platform and application software, the content information may comprise a specific platform version and/or specific application version of platform and application software in the respective bundle. If a bundle contains communication component(s) for the computer 117, the content information may comprise a specific version number of the communication component(s) in the respective bundle. The bundle information may include or be stored in association with location information (e.g., a UNC path or URL to the bundle) about the bundle so that Application Loader 312 can obtain the correct bundle once determined. The bundle information and/or location information associated with a bundle may be stored, for example, in the form of metadata in the device software share 404. The bundle information may be stored, for example, in an LDAP directory 130 in LDAP directory service implementations, or in another directory or location in a directory or file lookup service implementations.

Patches or fixes for mobile communication devices 201 may be stored in association with device attribute information (e.g. technical capabilities) or device identifying information (e.g. one or more device identifiers) of the affected mobile communication devices 201.

The bundles may be selected, downloaded or otherwise obtained, and stored in the device software share 404 by an enterprise IT administrator based on device attribute information such as the device model ID and wireless network carrier ID of the mobile communication devices 201 in use by the enterprise. In this way, the device software share 404 contains only device software bundles which are relevant to enterprise mobile communication devices 201. Alternatively, if the mobile data server is operated by a mobile data service provider, an IT administrator for the mobile data service provider typically selects, downloads and stores only those device software bundles which are relevant to the device model IDs supported by the mobile data service provider.

Unbundled device software may similarly be based on device attribute information and/or language(s) supported, and have device software information associated with it similar to bundle information. As with bundle information, device software information comprises device attribute information of devices on which the device software may be loaded onto, and content information describing the contents of device software, and possibly location information about the location of the unbundled device software. Unbundled device software may be selected, downloaded or otherwise obtained, and stored in the device software share 404 by an enterprise IT administrator based on device attribute information or other parameters as with device software bundles.

The device software share 404 may comprise a number of different data stores (also referred to as data storage elements). The device software and communication components for the computer 117 (whether bundled or unbundled) may be stored on the same data store or different data stores. The basis of device software bundles may differ between embodiments of the present disclosure, as described more fully below.

In some embodiments, the Application Loader 312 is not part of the local software on the computer 117 or the installed device communications component stack 402. The Web-based device management application 302 is typically provided with a Uniform Naming Convention (UNC) path to a location in the device software share 404 where the executable files and other support modules of the Application Loader 312 are located. The Application Loader 312 may be executed directly from the device software share 404 via the UNC path. Typically, the UNC path is provided as part of the DHTML web page(s) of the Web-based device management application 302 with associated JavaScript for invoking the Application Loader 312 from the URL in response to user input to run Application Loader 312. The SC device controller 311 is typically invoked by the Web-based device management application 302 which downloads or launches Application Loader 312 from the device software share 404

Alternatively, the Web-based device management application 302 may be provided with a Uniform Resource Locator (URL) in the network 124 or the Internet 112 (e.g. on a remote Internet server 134) where the Application Loader 312 executable files and other support modules may be downloaded from. Typically, the URL is provided as part of the DHTML web page(s) of the Web-based device management application 302 with associated JavaScript for invoking the Application Loader 312 from the URL in response to user input to run the Application Loader 312. The SC device controller 311 is typically is invoked by the Web-based device management application 302 which downloads Application Loader 312 from the URL, caches it locally on the computer 117, and launches Application Loader 312 from the cached copy at runtime.

Invoking the Application Loader 312 from the device software share 404 via the UNC path may have advantages over downloading the program from an URL and running it from a cached copy. Running Application Loader 312 from the device software share 404 ensures that it will be current enough to load any device software in the device software share 404. However, if Application Loader 312 is run from a cached copy it will typically only have access to locally stored device software on the computer 117 which may be limited to, for example, third party applications. New device software and communication components are not likely to be stored on the computer 117.

In some embodiments, the Application Loader 312 includes a forced upgrade (load) function which requires the device user to run the Application Loader 312 application to upgrade (or validate) that the device software present on the mobile communication device 201 is up to date. The forced upgrade function may be controlled by administrators using IT administrator-defined IT policy settings. A forced upgrade policy 274 may be implemented using IT policy messages which are pushed out to the mobile communication devices 201, for example, by the mobile data server 120. The forced upgrade policy 274 may be stored in the memory of the mobile communication devices 201, for example in the flash memory 244 or on the mobile data administration server 122. In some embodiments, the administrator may permit the device user to "defer" the forced upgrade. In some embodiments, the forced upgrade may be deferred up to a predefined maximum number of times.

In embodiments where the forced upgrade may be deferred up to a predefined maximum number of times, a forced upgrade policy count parameter is maintained. Typically, the forced upgrade policy count is a value representing the number of upgrade deferrals (delays, bypasses, etc.) that are remaining. Alternatively, the forced upgrade policy count may be a value representing the number of deferrals which have been made.

In some embodiments, the forced upgrade policy count parameter may also used to indicate whether a forced upgrade policy is in effect, for example by setting the value of the forced upgrade policy count to a predetermined non-numeric or zero value. Alternatively, a separate parameter may be used to indicate whether a forced upgrade policy is in effect. The forced upgrade policy count may be stored in memory on the mobile communication device 201, for example in flash memory 244, or on the mobile data administration server 122.

In some embodiments, the Application Loader 312 has several operational modes. In the first operational mode, the Application Loader 312 is configured to load the most current device software onto the mobile communication device 201, overwriting the existing device software. This operational mode may be useful if the existing device software is corrupted. In the second operational mode, the Application Loader 312 is configured to determine the device software for which an upgrade is available and upgrade only those components.

In a third operational mode, the Application Loader 312 is used to transferred data 220 (such as user data 222, service data 224 and other data 226) from a first connected device to a second connected device. The data 220 may comprise third party applications, device settings and preferences. This operation is sometimes referred to as a "device switch" and may be used when a user is upgrading their mobile communication device 201, or switching between mobile communication devices 201. In this operational mode, the Application Loader 312 loads the most current device software onto the second connected mobile communication device 201, activates the second mobile communication devices 201, and transfers user data 222 such as user documents/files, third party applications, device settings and preferences to the second connected device. The first connected device and second connected device need not be connected at the same during a device switch operation, in which user data 222 is backed up on the computer 117 as a preliminary step of the device switch operation.

The Application Loader 312 may be configured to first determine if a device software upgrade is available (for example, by perform a version check), and then prompt for the device user for input regarding whether an upgrade should be performed if a device software upgrades that applies to the mobile communication device 201 has been found. Prompting the device user in this manner allows the device user to decide whether the upgrade is performed following the version check, or whether the upgrade is delayed (for example, to a more convenient time for the user). In some embodiments, a version check of some or all of the device software is performed automatically by the Application Loader 312 without any input from the device users, typically in a manner which is invisible to the device user. In such embodiments, the Web-based device management application 302 automatically invokes the Application Loader 312, for example, after the expiry of a predetermined amount of time since the last version check or upgrade. The device user is only notified if an upgrade is available. If deferrals are allowed, the device user may be given the option to defer the upgrade up to the predetermined maximum. If deferrals are not allowed, the upgrade may be performed automatically without any user input.

In some embodiments, the Application Loader 312 and/or Web-based device management application 302 may be notified that new device software has been added to the software share 404 and is available for an upgrade. If the Application Loader 312 has been updated, this information may be part of the upgraded Application Loader 312 processing logic. Alternatively, the Application Loader 312 and/or Web-based device management application 302 may be notified by an IT policy message sent by the administrator. Device users may also be notified that new device software has been added to the software share 404 and is available for an upgrade, for example by an email message sent by the administrator.

The Application Loader 312 may be provided with a forced upgrade policy message to present device users, for example, notifying device users when a forced upgrade policy is in effect. The message may be a freeform message which may include any content chosen by the IT administrator, or may be populated from the forced upgrade policy or IT policy assigned to the user and stored on the mobile communication device 201. The message may be set by the administrators and used to inform the user that the Application Loader 312 has determined that an upgrade is available and optionally the number of deferrals remaining. In some embodiments, software upgrades may be classified in accordance with a classification system. For example, in accordance with some classification systems, software upgrades may be classified as critical or non-critical. In such embodiments, the message may indicate the classification of the upgrade, i.e. as a critical upgrade or non-critical upgrade. Alternatively, information regarding whether the upgrade is a critical upgrade may be stored by the mobile data administration server 122 with the other data about the device software. Critical upgrades may be given no deferrals in the forced upgrade policy 274 so that such upgrades are performed more quickly. Critical upgrades may also be forced over-the-air (OTA).

Figure 5:
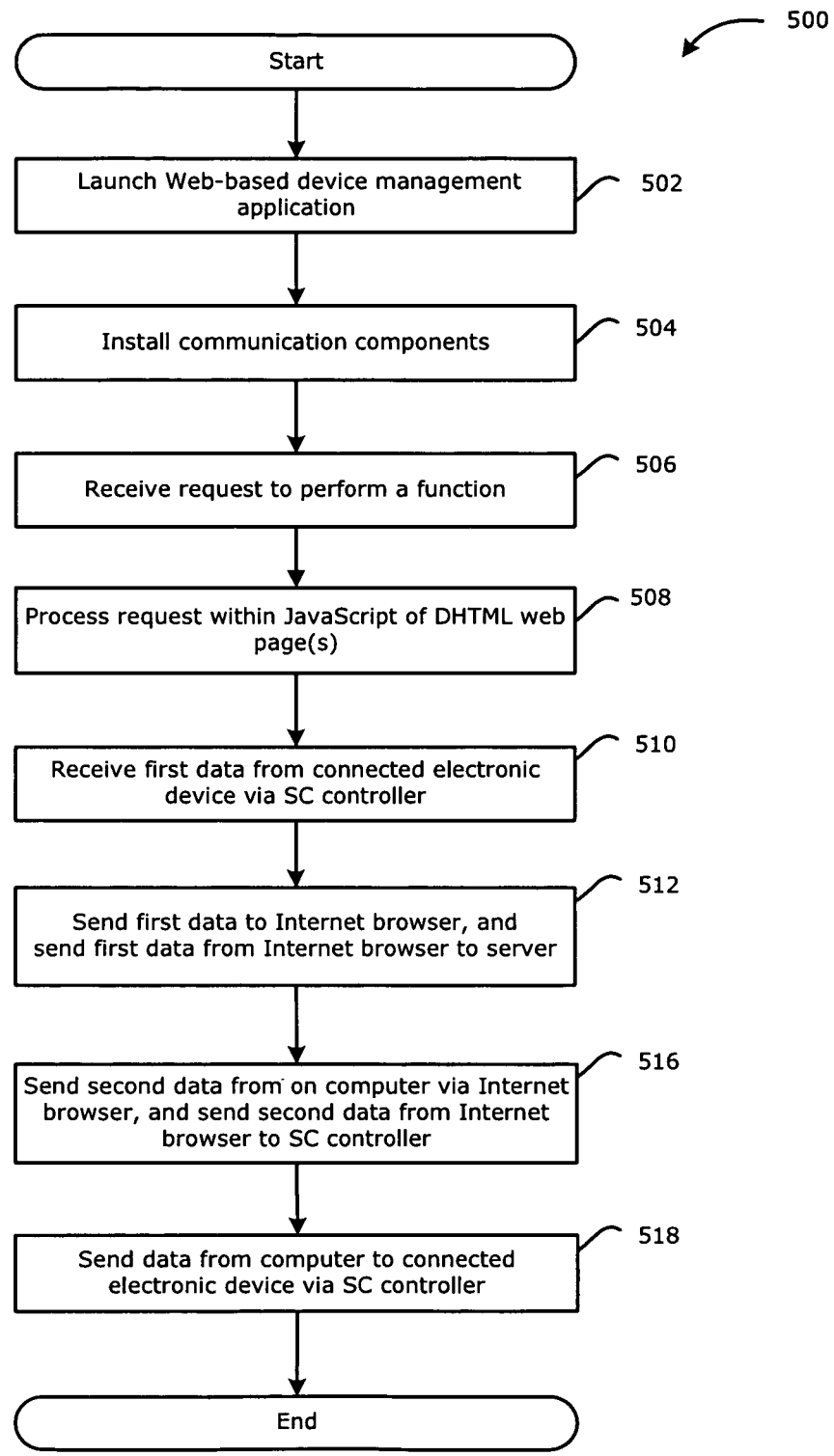
FIG. 5 is a flowchart illustrating a communications exchange in accordance with one embodiment of the present disclosure.

Referring now to FIG. 5, an example communications exchange 500 between the Web-based device management application 302 and a mobile communication device 201 in accordance with one embodiment of the present disclosure will now be described. In this example, the computer 117 and mobile communication device 201 are connecting using a communications protocol comprising at least one of the Universal Serial Bus (USB) communications protocol or Bluetooth® communications protocol. The communications protocol is implemented using device drivers 312 and possibly a device manager 314, which may be implemented using the same or different software modules. In some embodiments, the mobile communication device 201 may connect to the computer 117 using both Bluetooth® and USB communications protocols.

In the first step 502, a user of the computer 117 accesses the Web-based device management application 302 using the Internet browser 310 (e.g., Internet Explorer™) by accessing a Uniform Resource Locator (URL) controlled by the mobile data administration server 122 provided by the administrator. The Internet browser 310 downloads the DHTML web page or page(s) of the Web-based device management application 302 onto the computer 117 from the URL, and displays the DHTML web page within the Internet browser 310. Typically, the user must login to the Web-based device management application 302 by providing their user credentials (i.e., username and password provided by the administrator) via the DHTML web page(s) of the Web-based device management application 302. The username and password may be associated with the messaging server 132 or a unique username and password defined for the mobile data administration server 122 or mobile data server 120 (for example, where mobile data server 120 does not have an email account associated with the user). Alternatively, in some implementations, for example if the mobile data administration server 122 is a public server, there may be no login and user credentials are not provided.

In the next step 504, communications components comprising one or more of the device manager 314, the device drivers 316, and/or the SC device controller 311 may be downloaded to the computer 117, for example, using an LDAP directory service as described above. This step is optional and is not performed after every login. This step is typically performed only when the communications components are not installed on the computer 117, or when the version installed on the computer 117 is out of date. The SC device controller 311 (e.g., ActiveX control) may also need to be instantiated within the Internet browser 310. If the mobile communication device 201 has Bluetooth® connectivity, typically it must connect to the computer 117 using USB during the first login so that the necessary device drivers can be installed, if not installed already. The initialization parameters controlling the SC device controller 311 behaviour may be set to limit the number of instantiations of the device controller 311 (for example, an ActiveX control) to one to prevent conflicts from multiple instantiations of the Application Loader 312. This may occur as a result of the user cloning the current Internet browser 310 window in a new window, for example.

In the next step 506, a request is sent to the Web-based device management application 302 to perform a function or service. The request is usually a user request sent from the computer 117 via interaction with a user interface element of the web page (e.g. clicking a user interface tab or on-screen button presenting in the web page and/or possibly entering data in a data entry field of the web page); however asynchronous server originating requests could be sent to the Web-based device management application 302 in addition or instead of user requests. The request may be a request to load device software onto the mobile communication device 201, a request to activate or provision a mobile communication device 201, a request to backup data of the mobile communication device 201, or a request to switch user devices which are activated and bound to the mobile data server 120. Other types of requests may also be received by the Web-based device management application 302.

In the next step 508, the request is received by the Web-based device management application 302. The request is typically processed by the JavaScript engine of the Internet browser 310 which processes the request in accordance with JavaScript of the DHTML web page; however requests could be passed through the JavaScript engine. It will be appreciated that the JavaScript primarily controls the functionality of Web-based device management application 302. The DHTML web page is typically redisplayed within the Internet browser 310 in accordance with the output of the JavaScript engine. For example, a request to load device software will result in a Web page concerning the device software loading function to be displayed within the Internet browser 310.

In the next step 510, first data may be obtained from the mobile communication device 201 by the SC device controller 311. In response to the request, the JavaScript interpreted by the JavaScript engine calls the SC device controller 311 which obtains the first data. This may be a background call which does not produce any change in the web page presented in the Internet browser 310. As described above, the SC device controller 311 interfaces the JavaScript engine of the Internet browser 310 with the communication protocol connecting the mobile communication device to the computer 117 (e.g., USB or Bluetooth®). The first data may be device attribute information such as hardware and software capabilities of the device 201 and/or user information (e.g. user name or mailbox identifying information) for use in device provisioning, the device model ID and wireless network carrier ID for use in device software loading (or upgrading), or other information about the connected device and possibly the user. This data may be used for many purposes other than device provisioning and device software loading such as, for example, updating the DHTML web page. The first data obtained from the device 201 depends on the request in step 506. It is possible that some requests may not require data to be obtained from the device 201. If the request was a request to backup data from the device 201, the data obtained from the device is user application data. The first data may be IT policy data stored on the device 201.

In the next step 512, the first data obtained from the device 201 is sent from the SC device controller 311 to the scripting engine of the Internet browser 310, and from the Internet browser 310 to the mobile data administration server 122. In response to obtaining the first data, the JavaScript interpreted by the JavaScript engine instructs the Internet browser 310 to make a background HTTP request to the mobile data administration server 122. This background HTTP request transmits the first data to the mobile data administration server 122 and possibly requests a response. The background HTTP request does not produce any change in the web page presented in the Internet browser 310. It some cases, the first data is not transmitted to the server 122, for example, if the request was to perform a local backup to the computer 117, the first data is saved on the computer 117 and not sent to the server 112. In some cases, information derived from the first data may be sent to the mobile data administration server 112 such as, for example, that a local backup to the computer 117 as performed.

In some embodiments, the operations may be entirely server-side in nature, whether as a result of a user request in step 506 or an asynchronous server originating request. In such cases, the steps 510 and 512 may be omitted and operations proceed to step 516.

In the step 516, second data may be received from the mobile data administration server 122 by the Internet browser 310 as an HTTP response. The content of the second data is dependent on the first data (e.g., device attribute information, IT policy data and/or user identifying information) and one or more predetermined parameters comprising at least the content of the request in step 506. The second data may be generated on the mobile data server 120 or mobile data administration server 122, or selected by the mobile data administration server 122 in accordance with the first data. The second data may be, for example, service data such as service books for provisioning the device 201. The service data is dynamically generated for the device 201 by the mobile data server 120 or mobile data administration server 122 and is based, at least in part, on the first data (e.g. hardware and software capabilities of the device 201) received by the server 122 (which may be sent to the mobile data server 120). The service data may include IT policy data such an IT policy message in addition to or instead of service data. As noted above, IT policies are defined by the IT administrator. The IT policy data is based on the identity of the user as determined by the user information. If the request is a restore operation from a remote backup on the server 122 or a server connected to the mobile data administration server 122, the second data is user application data. The IT policy data depends on the identity of the user. The identity of the user may be determined based identifying information obtained from the device 201 and contained in the first data, or from separate identifying information obtained from the Internet browser 310 based on the login information in step 502.

Next, in step 518 the second data is sent from the Internet browser 310 to the SC device controller 311 via the scripting engine, and from the SC device controller 311 to the device 201 through the communications protocol. The operations 500 then end. In the context of device provisioning operations, the service data (e.g. service books) and IT policy data is sent to the device 201 and stored thereon. The service data provides the device 201 with the necessary data to connect to the wireless network 102 through the wireless network gateway 110 and mobile data server 120, etc. The IT policy data allows IT policy to be enforced on the device 201. In the context of a restore operation from a remote backup operation, the backup user application data is sent to the device 201 and stored thereon.

While example types of data for use in a communications exchange have been described, it will be appreciated that the communications exchange described above may be used to obtain any type of data from a connected electronic device (which need not be a mobile communication device) and send this data from an Internet browser to a remote server. The communications exchange described above may also be used to obtain any type of data from a remote server using an Internet browser, and to send this data to the connected electronic device. Thus, any type of data may be exchanged between the connected electronic device and computer 117, and between the computer 117 and mobile data administration server 122, and in either direction. In addition, the connectivity between the connected electronic device, computer 117, and mobile data administration server 122 which has been described may be used by Web applications other than a Web-based device management application 302.

While the present disclosure has been described primarily in the context of a method and system for communicating between an Internet browser and a mobile communication device 201, it will be appreciated that the methods described herein may be applied to communications between an Internet browser and other types of electronic devices such as cameras, or other USB or Bluetooth® connective devices. Furthermore, while the communications protocol(s) for the computer 117 to communicate with the mobile communication device 201 comprises device driver(s) and a device manager in the above-described embodiments, the device manager may be omitted in some embodiments, particularly in the context of electronic devices other than mobile communication devices 201.

Figure 6:
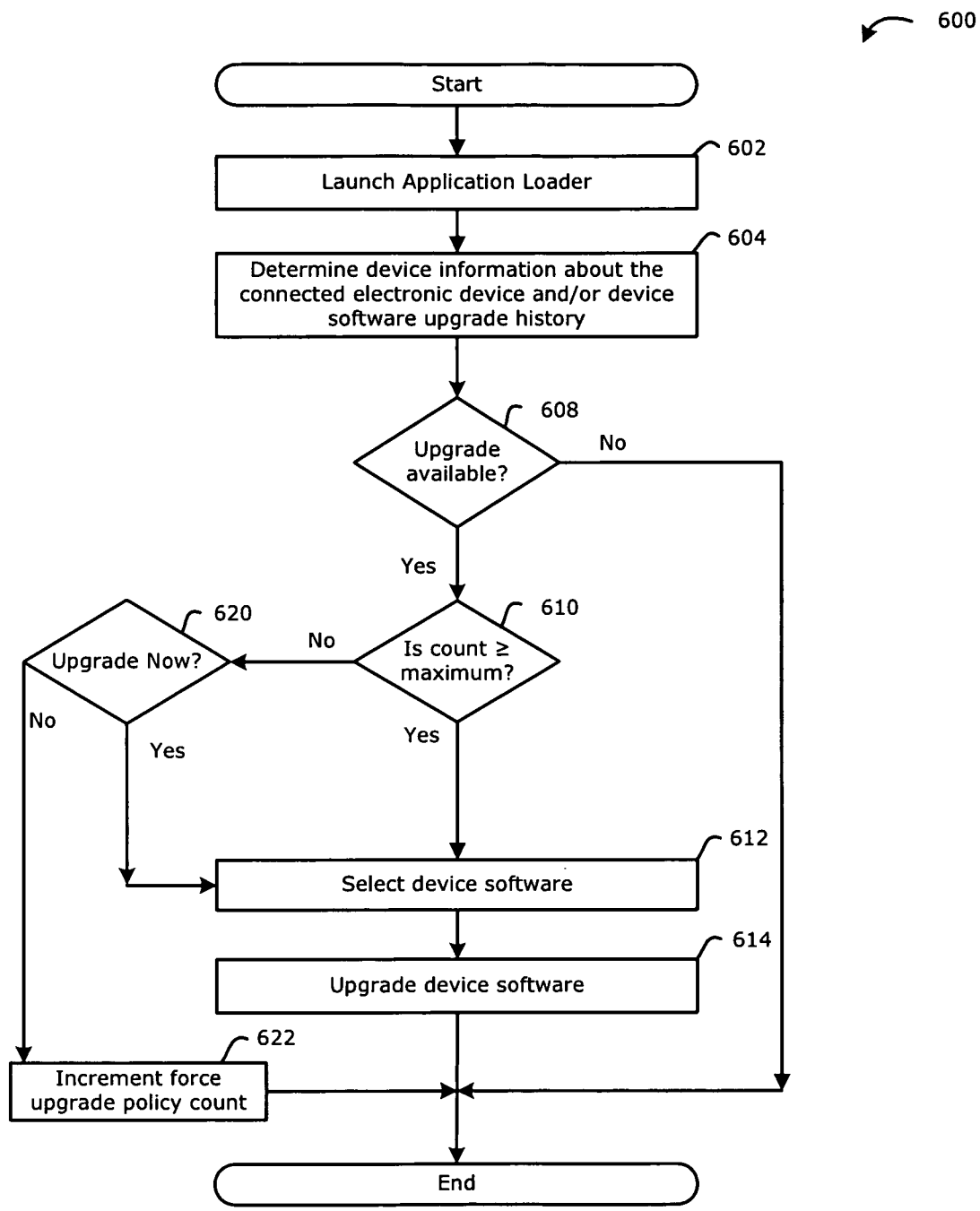
FIG. 6 is a flowchart illustrating operations for loading device software in accordance with one embodiment of the present disclosure.

Referring now to FIG. 6, example operations 600 for upgrading device software of an electronic device connected to a computer 117 in accordance with one embodiment of the present disclosure will now be described. The computer 117 and connected electronic device are connecting using a communications protocol comprising at least one of the Universal Serial Bus (USB) communications protocol or Bluetooth® communications protocol. In some embodiments, the mobile communication device 201 may connect to the computer 117 using both Bluetooth® and USB communications protocols. The communications protocol is implemented using device drivers 312 and possibly a device manager 314, which may be implemented using the same or different software modules. The computer 117 may be any computer having an Internet connection and is not necessarily an enterprise computer 117; however for security purposes typically a secure mechanism for securely connecting to the mobile data administration server 122 is typically required, such as VPN or an HTTPS connection. VPN/HTTPS encryption can be used to protect the user name and password used to log in. An HTTPS connection is also useful in both the public and enterprise implementations of the mobile data administration server 122 to validate the identity of the server 122 to the client running on the computer 117.

In the first step 602, after logging into the Web-based device management application 302, the user launches the Application Loader 312 from the Web-based device management application 302 via a user request to perform a device software load or upgrade (such as a request 506 in the operations 500 described above). A device software load may be performed to restore device software after a device wipe or after components have been removed, to upgrade the device software, or during a device switch. During a device switch the status of the device software on the device 201 the user is switching to may not be known (e.g. it may be out of date or the device 201 may have been wiped), and so the most current device software may be loaded onto the device 201 during a device switch. Typically, if the device password was not previously provided to the Web-based device management application 302, for example during login, or if a time limited password caching policy is implemented (typically by the device manager 314) and the predetermined time of password caching policy has lapsed without any activity by the user, the Application Loader 312 will prompt the device user for the device password for the connected device 201.

The request is received by the Web-based device management application 302. The request is processed by the JavaScript engine of the Internet browser 310 which processes the request in accordance with JavaScript of the DHTML web page. Depending on the implementation, the output of the JavaScript Engine (e.g., the result of the JavaScript of the DHTML web page) causes the Application Loader 312 to be launched from a UNC path to a location in the device software share 404. The location in the device software share 404 is provided in the JavaScript of the DHTML web page. As noted above, the UNC path points to the location in the device software share 404 where the executable files and other support modules of the Application Loader 312 are located. Alternatively, Application Loader 312 may be downloaded from an URL, cached locally on the computer 117, and launched from the cached copy. It will be appreciated that Application Loader 312 is not launched if a request which does not require it is received.

In some embodiments, once launched Application Loader 312, may communicate directly with the mobile data administration server 122 by opening its own communications channel to it. In such embodiments, the process of launching Application Loader 312 will include parameterizing this launch with the necessary information to permit Application Loader 312 to make its own direct connections to the mobile data administration server 122. These attributes could include session cookies/URL, as well as the mobile data administration server 122 address. This bypasses the scripting engine and browser HTTP layer. Alternatively, in other some embodiments Application Loader 312 may communicate with the mobile data administration server 122 using the SC controller 311 and Internet browser 310 as intermediaries.

Optionally, a check may be performed to determine if the user has permission to perform a device software upgrade. For example, in enterprise deployments administrators may not wish users to perform device upgrades from a public mobile data administration server 122 since there is no control over the device software which may be loaded, or may wish to limit the device software which may be upgraded or loaded on to the device 201. In some embodiments, the check may comprises determining whether an IT policy restricting software upgrades is stored in memory on the device 201 (e.g. in flash memory), reading the IT policy rule or rules defined by the IT policy, and applying any IT policy rules is applied. Reading the IT policy may require the controller 311 to interface with scripts in the web page to request and receive the IT policy from the device 201. The IT policy may specify that no device software upgrades are permitted, that no device software upgrades are permitted from a public mobile data administration server 122, or that only a subset of the device software in the share 404 may be loaded onto the device 201 (whether the server 122 is a public server or enterprise server). The subset of the device software may be stored separately in the share 404 of the public server, or the IT policy may define a filter or parameters by which the mobile data administration server 122 or Application Loader 312 can determine the available device software for the device 201. Depending on the implementation, this check may be performed by the mobile data administration server 112 or by Application Loader 312. If the check is performed by the mobile data administration server 112, the IT policy rule may need to be sent from the SC controller to the Internet browser 310, and from the browser 310 to the mobile data administration server 122. If an IT policy relating to device software loads (upgrades) is stored on the device 201, it will be followed. In other embodiments, the policy could be stored on the mobile data administration server 122 or mobile data server 120.

If no IT policy relating to device software upgrades is stored on the device 201, or if the IT policy does not contain a rule which limits device software loads (upgrades), the administrator has not placed any controls on whether or not enterprise users can perform a device software upgrade via a public mobile data administration server 122. In this case, processing proceeds to step 604.

If the IT policy contains a rule that specifies no device software upgrades are allowed 122, and the upgrade operations 600 end. If the IT policy contains a rule that specifies that no device software upgrades are allowed from a public mobile data administration server 122 and that mobile data administration server 122 is a public server, the upgrade operations 600 end.

If the IT policy contains a rule that specifies only some device software may be loaded, this information is used in step 606 when determining the device software for the device 201 which is available. The IT policy could specify, for example, that only bundles of platform and application software may be loaded (i.e., separate, standalone applications cannot be installed), only approved bundles of platform and application software may be loaded (e.g. only bundles with approved applications), or only patches or fixes may be loaded via the public server.

Next, in step 604 the Application Loader 312 obtains device information, such as device attribute information, about the connected mobile communication device 201 using the communication protocol connecting it to the computer 117. The SC controller 311 reads the device attribute information (e.g. device model ID and wireless network carrier ID) from the mobile communication device 201 over the communications protocol (e.g. USB or Bluetooth) connecting the computer 117 to the mobile communication device 201. The device attribute information is read from local memory on the device 201, for example from ROM, possibly in a boot ROM. The SC controller 311 then passes this information to Application Loader 312.

In other embodiments, the device attribute information may comprise version information about the current state of the device 201 which is stored on the device 201, for example, in flash memory 244. The version information contains information about versions of the various device software components of the device 201—these components are described more fully below. The device software load history may also be stored on the computer 117, typically in the form of an XML (eXtensible Markup Language) file. The device software load history may be stored in the form of XML string data in the XML file. The device software load history allows the current state of the device 201 to be determined even the device 201 is not connected to the computer 117, and allows the current state of the device to be determined more efficiently even when the device 201 is connected. In other embodiments, the device software load history could be stored on the mobile data administration server 122 or database 126.

In other embodiments, device attribute information may comprise summary device information about the device 201. Summary device information may comprise one or more of the following (depending on the device properties some of the summary device information may not be applicable or available):

(1) the personal identification number (PIN) of the connected device (the unique number of the device that identifies it to the device manufacturer and/or between device manufacturers);

(2) the radio network family (for example, a value indicating the core radio technology of the device which may include, but is not limited to, MOBITEX, DATATAC, GPRS, CDMA, IDEN, Wi-Fi™, UMTS, and unknown (if it cannot be determined));
(3) the connection media (for example, a value identifying the physical transport through which the device is connected to the end-user's computer which may include, but is not limited to serial connection, a USB, BLUETOOTH);
(4) the device globally unique identifier (GUID) (an identifier that is unique to the connected device, typically string-valued) which uniquely identifies the mobile communication device 201 in all wireless networks around the world; and
(5) the core application version (which, in some embodiments, is a numeric representation of the functional level of the capabilities of the connected device—it is an approximation that can be used to identify the generation of the device, but provides no specific details of individual device capabilities).

In other embodiments, device attribute information may comprise detailed device information about the device 201. Detailed device information may comprise one or more of the following (depending on the device properties some of the detailed device information may not be applicable or available):
(1) the device model (e.g., name or number);
(2) the built-in memory flash size of the device (e.g., in kilobytes), excluding any removable storage;
(3) the version number of the "platform" software installed on the device (platform refers to device core system software, including the device operating system (OS) which comprises a graphical user interface (GUI) for controlling the operation of the device 201, radio code and Java Virtual Machine (JVM) each of which has an individual version number, and possibly Java .cod files);
(4) the version number of the application software installed on the device;
(5) the electronic serial number (ESN) associated with the device (the unique number of the device that identifies it to the wireless network for access);
(6) the display screen height (e.g., in pixels);
(7) the display screen width (e.g., in pixels); and
(8) the WAN frequencies supported by the device.

Summary device information and detailed device information are stored in a memory area (not shown) in the flash memory 244, and are retrieved using application-level data access protocols. The device 201 populates this memory area with the date obtained from other resources and locations in memory. For example, the wireless network carrier ID (also known as the vendor ID) may be retrieved from a read-only "branding area" whereas the device model ID (also known as the device hardware ID) may be stored in a "boot ROM" area. Other values, such as the current platform version and application version, may be read from the respective software components themselves, and hence even the original values are stored in the mutable flash areas. In at least some embodiments, summary device information may be obtained from any connected mobile communication device 201 without the device password. Detailed device information may require the device password to be supplied on the computer 117 to be obtained from a connected mobile communication device 201.

Alternatively, in other embodiments device attribute information such as device software information, device configuration and/or technical capabilities may be maintained by the mobile data administration server 122.

Next, in step 608 the Application Loader 312 determines whether a device software upgrade (sometimes referred to as an update) is available using the device attribute information (for example, using the device model ID and wireless network carrier ID) and possibly an IT policy rule limiting the software which may be loaded on the device 201. Application Loader 312 determines candidate device software in the device software share 404 by comparing the device attribute information determined in step 604 and possibly an IT policy rule to the device software information about the device software in the share 404. This comparison may be based on any relevant data or metadata concerning the device software information, device configuration and/or technical capabilities.

In some embodiments, determining whether a device software upgrade is available comprises identifying candidate device software having associated device attribute information which matches device attribute information of the device 201, and performing a version comparison of the device software on the share 404 to the version of the device software on the device 201. The version comparison comprises determining the version(s) of the device software on the device 201, determining the version of the device software on the device 201, and comparing the version of the device software on the device 201 to the versions in the device software share 404. An upgrade is available if one or more versions on the share 404 are more recent than the version on the device 201. It will be appreciated that there is a plurality of device software versions in bundled and unbundled form in the share 404 and that there may be more than one version of device software in the share 404 which is newer than that on the device 201.

The version identifier which is compared may relate to one or more of the core application version installed on the device 201, the version number of the "platform" software installed on the device 201, the version number of the operating system software installed on the device 201, and the version number of the application software installed on the device 201. Alternatively, the version may related to a combination of the "platform" software installed on the device 201, the version number of the operating system software installed on the device 201, and the version number of the application software installed on the device 201.

Software bundles may have their own version numbers independent of the version of the platform and application software contained within it. Each bundle number is incremented from the previous bundle number and is associated with a device model ID and wireless network carrier ID. Thus, higher bundle numbers may have not have the most recent version of the platform and application software because, for example, the bundle was a custom bundle created for a special purpose (such as with software added or removed) but is not necessarily the newest software. A preliminary bundle selection may be made based on the highest bundle number for respective device model ID and wireless network carrier ID. After preliminary bundle selection, the platform and application version numbers of the software contained in the bundle may be compared to the corresponding versions on the device 201. If the bundle does not contain newer platform and application version numbers than that on the device 201, other bundles may be selected for respective device model ID and wireless network carrier ID in decreasing order with respect to the bundle number, and then examined to determine if they contain newer platform and application software than that of the device 201.

Determining whether a software upgrade is available may comprise determining whether any device software or device software components (e.g. applications or application components or language support modules) stored in the central repository are not installed on the mobile communication device 201. An upgrade is available when any device software or device software components are available in the central repository which have not been installed on the mobile communication device 201.

Determining whether a software upgrade is available may comprise determining whether any patches are stored in the central repository, and determining whether patches stored in the central repository have been installed on the mobile communication device 201. An upgrade is available when any patches are available in the central repository have not been installed on the mobile communication device 201.

In other embodiments, determining whether a device software upgrade is available comprises determining the technical capabilities of the mobile communication device 201 from the device attribute information, and determining if an upgrade or patch specific to the technical capabilities of the device is available. The technical capabilities may be one or more of: radio network family, connection media, connection port, device model, the display properties (i.e., such as screen height and/or width), and the WAN or other and/or wireless frequencies supported by the device 201. By providing device software upgrades based on technical capabilities of the mobile communication device 201, device software upgrades may be released to address concerns associated with the technical capabilities of the devices 201, for example based on determined problems with device components of one or more mobile communication devices 201.

In other embodiments, determining whether a device software upgrade is available comprises determining identifying information of the mobile communication devices 201, and determining based on the identifying information if an upgrade or patch specific to the device is available. The identifying information may comprise one or more of: the IMEI for GSM and UMTS devices, IMSI for GSM and UMTS devices, PIN, GUID, and ESN of the mobile communication device 201. By providing device software upgrades and bundled software upgrades based on identifying information of the mobile communication device 201, software upgrades or device software bundles may be released to address concerns associated with identified devices 201, for example based on determined problems with identified devices 201. For example, manufacturing information about the devices 201 and/or device components may be traced to the identified devices 201 via the identifying information and software patches/upgrades released for the affected devices 201.

In other embodiments, determining whether a device software upgrade is available comprises analyzing the device software load history. This may comprise determining the software configuration or version of device software from a previous software load from the device software load history, and comparing the previous software configuration or version against the most recent (i.e., current) software configuration or version for the mobile communication device 201 in the software share 404. An upgrade is available when the version of the device software in the central repository is more current than the version of the previous software loaded on the mobile communication device 201. This device software load history may be stored in the computer 117, the mobile data administration server 122 or database 126, or possibly the device 201. The comparison may comprise comparing device attribute information and version information as described above, or may comprise comparing device attribute information and the date of the last device software load (or upgrade) with the date of the most recent candidate device software in the share 404.

Alternatively, Application Loader 312 may determine candidate device software which can be loaded onto the device 201 in accordance with the device attribute information. Candidate device software information comprising a list of candidate device software and descriptor information describing the candidate device software is sent to and displayed in the Internet browser 310. The user can then select the device software to be loaded (upgrade or added) from the list of candidate device software. Location information about the candidate device software may be previously provided to Application Loader 312, later determined or provided, or included in the candidate device software information.

The list of candidate device software may comprise a list of different versions of particular device software, device software bundles containing different combinations of device software versions (for example, different platform and application version combinations), language support packages or add-ons for the device operating system for supporting different languages on the device 201 (e.g. French or Chinese where the installed OS supports English only), standalone applications or application bundles including third party applications, or components of any of the above. Thus, the user may be able to select between bundles, individual software applications, or components.

If a device software upgrade is not available, i.e., the mobile communication device 201 already has the latest device software loaded, the processing ends. Typically, the device user is returned to the home page (i.e., DHTML web page) of the Web-based device management application 302.

If a device software upgrade is available, i.e., the mobile communication device 201 does not have the latest device software loaded, processing proceeds to step 610 where a check is performed to determine if the user has any forced upload deferrals remaining, for example by determining if the forced upgrade policy count is greater than or equal to the forced upload deferral maximum. The forced upgrade policy count is typically stored in the memory of the mobile communication device 201, for example in flash memory 244, or on the mobile data administration server 122 or database 126. If Application Loader 312 was not provided with the forced upgrade policy count by the mobile data administration server 122 on startup, and it was not obtained from the device 201 along with the device attribute information, the Application Loader 312 will need to call back to the mobile data administration server 122 to obtain it or request it from the device 201, depending on where it is stored. In some embodiments, if no forced upload deferrals are remaining, a device software upgrade may be automatically performed without user input, for example, upon login to the Web-based device management application 302 or Application Loader 312.

If no forced upload deferrals are remaining, processing proceeds to step 612 where device software for the upgrade is selected. If the device software is bundled, the mobile data administration server 122 selects the appropriate bundle from the device software share 404. Next, processing proceeds to step 614 where the device software upgrade performed. The Application Loader 312 downloads the device software from the device software share 404 and installs the device software on the mobile communication device 201 over the communications protocol. Typically, the device user is returned to the home page (i.e., DHTML web page) of the Web-based device management application 302. In some embodiments, the device software upgrade files may be stored locally on the computer 117 in case of network connection failure. In the event of a network connection failure, the device software upgrade may continue based on the locally stored files.

If one or more forced upload deferrals are remaining, the operations 600 proceed to step 620. Next, in step 620 the device user is given the option whether to proceed with a device software upgrade. The Application Loader 312 may display a forced upgrade policy message on the display of the computer 117 notifying the device user that a forced upgrade policy is in effect, and that a device software upgrade is available. The message may also notify the device user of the number of deferrals remaining.

If the device user chooses to upgrade the device software (for example, via respective input on the computer 117), processing proceeds to steps 612 and 614 where the device software for the upgrade is selected and the device software upgrade is performed. The device software is downloaded by Application Loader 312 from the device software share 404. The device software is typically cached locally on the computer 117. Application Loader 312 then stores a copy of the device software to a predetermined local memory block on the mobile communication device 201, for example into flash memory 244, using the communications protocol (e.g. USB or Bluetooth) connecting the computer 117 to the mobile communication device 201.

Optionally a response regarding the success or failure of the device software load is transmitted from Application Loader 312 to the SC device controller 311. The SC device controller 311 then sends the response to the JavaScript engine of the Internet browser 310. The Internet browser 310 then sends the response to the mobile data administration server 122. If a forced upload policy is in effect and the force upgrade policy count is maintained by the mobile data administration server 122, the force upgrade policy count may be reset or cleared if the device software load was successful. Alternatively, if the force upgrade policy count is stored on the device 201, the force upgrade policy count on the device 201 may be reset or cleared without contacting the mobile data administration server 122. In other embodiments, the response regarding the success or failure of the device software load may be transmitted from Application Loader 312 directly to the mobile data administration server 122.

After the device software upgrade is performed, processing ends. Typically, the device user is returned to the home page (i.e., DHTML web page) of the Web-based device management application 302.

If the device user chooses not to upgrade the device software, the operations 600 proceed to step 622 where the forced upgrade policy count is incremented by one and processing ends. Typically, the device user is returned to the home page (i.e., DHTML web page) of the Web-based device management application 302.

The upgrade process 600 provides an efficient upgrade process for mobile communication devices 201, particularly in an enterprise environment where there may be a mixture of devices and possibly a mixture of wireless network carriers by automatically selecting the most recent device software for the device 201 being upgrade in accordance with the device model ID and wireless network carrier ID of the device.

In other embodiments, rather than providing Application Loader 312 with information about the device software in the share 404 and having it select the correct device software or device software bundle for the upgrade as in the described upgrade operations 600, callbacks may be made to the mobile data administration server 122. In such embodiments, the SC device controller 311 sends the device attribute information to the JavaScript engine of the Internet browser 310. The Internet browser 310 then sends the device attribute information to the mobile data administration server 122. The mobile data administration server 122 then selects device software to be loaded onto the device 201 in accordance with at least the device attribute information as described above. The mobile data administration server 122 may also perform the force load policy checks using forced load policy rule information and deferral information obtained by the SC device controller 311.

Alternatively, the mobile data administration server 122 determines candidate device software which can be loaded onto the device 201 in accordance with the device attribute information. Candidate device software information comprising a list of candidate device software and descriptor information describing the candidate device software (for example, taken from the share 404) is transmitted by the mobile data administration server 122 (for example, from the device software share 404) to the Internet browser 310 where it is displayed therein, and possibly to Application Loader 312. The user can then select the device software to be loaded (upgrade or added) from the list of candidate device software. The selection is sent from the computer 117 to Application Loader 312 and possibly to the mobile data administration server 122 via the Internet browser 310. Location information about the candidate device software may be previously provided to Application Loader 312, later determined or provided, or included in the candidate device software information.

The list of candidate device software may comprise a list of different versions of particular device software, device software bundles containing different combinations of device software versions (for example, different platform and application version combinations), language support packages or add-ons for the device operating system for supporting different languages on the device 201 (e.g. French or Chinese where the installed OS supports English only), standalone applications or application bundles including third party applications, or components of any of the above.

It will also be appreciated by persons of ordinary skill in the art that steps 610 and 622 are not performed in all embodiments, and are only performed in embodiments in which the forced upload function is available and implemented by the administrator, for example, via IT policy settings.

It will be appreciated that the upgrade operations 600 may be performed for each connected electronic device. If there is more than one connected device, the upgrade operations are typically performed serially. However, the operations 600 may be adapted to perform the upgrade operations for connected electronic devices in parallel.

While the upgrade operations 600 have been described as occurring in a particular order, it will be appreciated to persons skilled in the art that some of the steps may be performed in a different order provided that the overall functionality of operations is not impaired. Furthermore, while the detailed description describes loading device software and performing a software upgrade on a mobile communication device 201, it will be appreciated that teachings of the present disclosure regarding loading device software and performing a software upgrade may be applied to other types of electronic devices.

Activation of Mobile Communication Devices

Figure 7:
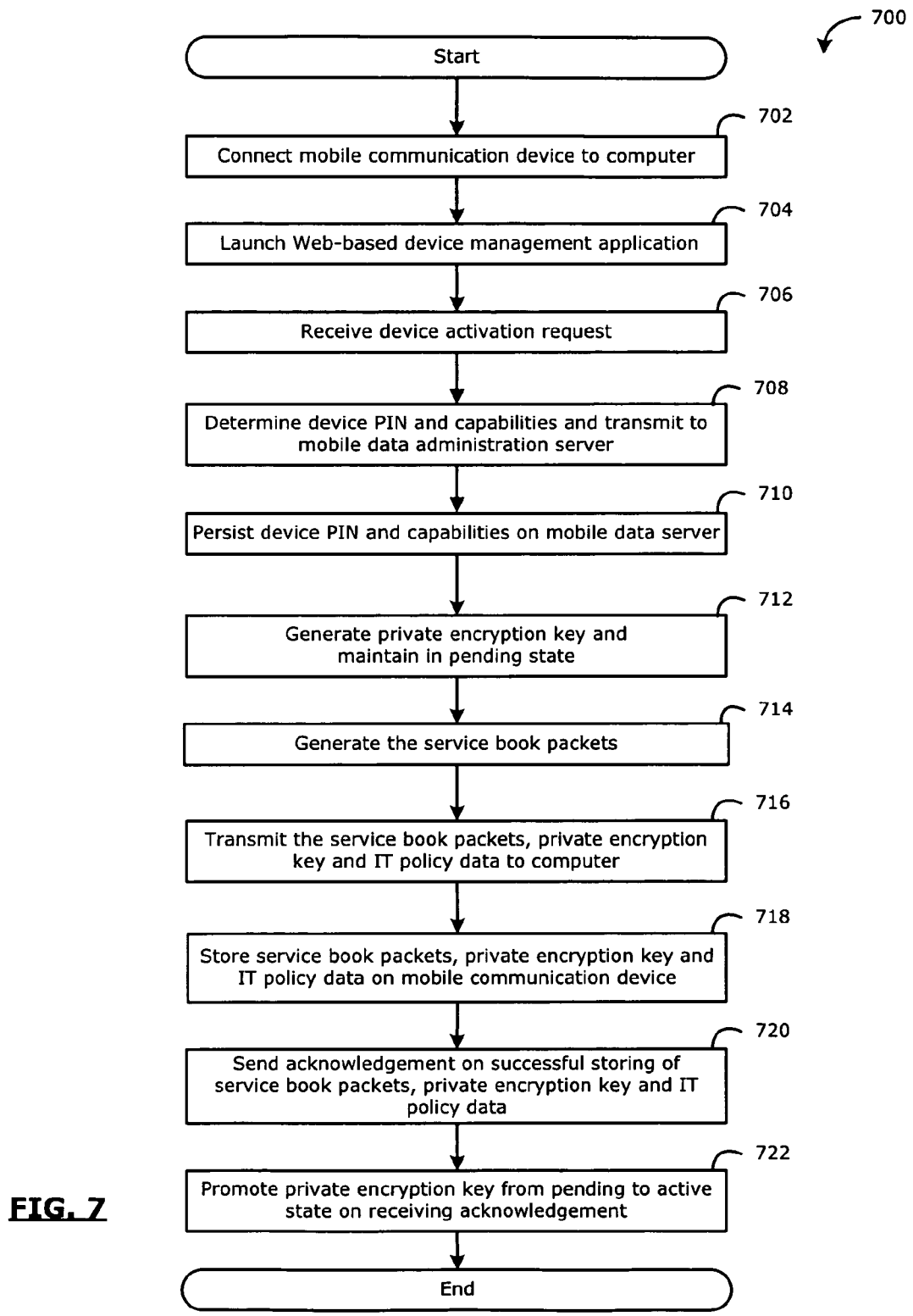
FIG. 7 is a flowchart illustrating operations for establishing a service relationship between a mobile communication device and a mobile data server in accordance with one embodiment of the present disclosure.
Figure 8:
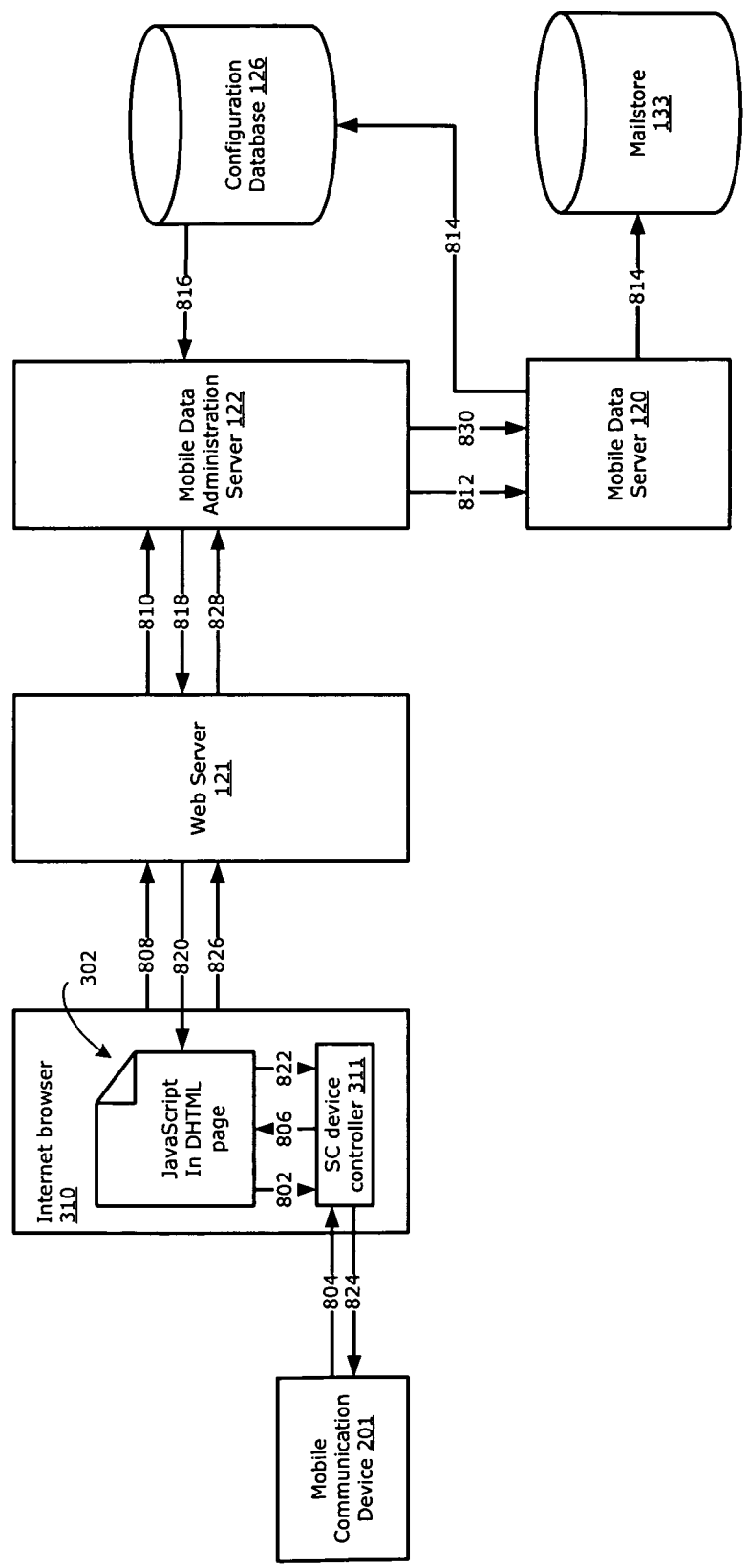
FIG. 8 a flowchart illustrating a communications exchange in a wireline activation of a mobile communication device in accordance with one embodiment of the present disclosure.

Referring now to FIGS. 7 and 8, example operations 700 for establishing a service relationship between a mobile communication device 201 and a mobile data server 120 for connecting to a wireless network in accordance with one embodiment of the present disclosure will now be described. This process is referred to as "activation". Activation is the process by which a mobile communication device 201 and the mobile data server 120 establish a service relationship. In simple terms, activation provides the mobile data server 120 with the information it needs to know about the mobile communication device 201 to provide the various wireless services, and provides the mobile communication device 201 with the information it needs to know about the mobile data server 120 to receive (access) those wireless services. The information stored on the mobile communication device 201 is referred to as service data and comprises information required by the device 201 to establish and maintain communications between the wireless network 101 (wireless network service data) and the wireless gateway 110 (gateway service data).

The service data stored on the mobile communication device 201 includes services books. A service book is a record that provides routing information about a service endpoint of the mobile data server 120. For secure transmission, encryption keys may be provided as part of the service book, or the encryption keys may be provided separately but associated with the respective service book. The service record effectively performs two functions: describing how to contact a service (the routing record) and describing how to it securely (the encryption key). The service record may also provide information about the service's features, capabilities and configuration. After activation, the mobile communication device 201 has the service records that the mobile data server 120 has provided to it. However, it is possible that the mobile communication device 201 may not make use or even support the services provided to it. Typically, to conserve memory on the mobile communication device 201 the mobile data server 120 will withhold service records for services which it knows that the mobile communication device 201 cannot support.

Service book records are typically associated with a particular "content type" which effectively identifies the application level protocol used for that particular service. Most mobile data servers 120 can provide several services to the mobile communication devices 201. For example, a typical mobile data server 120 can advertise several services, such as Email (CMIME), wireless calendar synchronization (CICAL), and PIM data synchronization (SYNC) among many wireless services. Other services may include an Internet Protocol (IP) Proxy for providing Internet access on the mobile communication device 201 and a Global Address Lookup (GAL) for accessing an enterprise address book on an enterprise device 201.

The activation process involves exchanging identifying information between the mobile communication device 201 and the mobile data server 120. In at least some embodiments, the identifying information about the mobile communication device 201 is the device PIN and the identifying information about the mobile data server 120 is a service unique identifier (UID). In other embodiments, different identifying information about the mobile communication device 201 (e.g. a different device identifier) and the mobile data server 120 (e.g. a different server identifier) could be used. The device PIN is a unique number assigned to each mobile communication device 201, typically expressed as a 32 bit number. The mobile data server 120 addresses data to a mobile communication device 201 by the device PIN.

The service UID is an identity string assigned to each mobile data server 120 that connects to a wireless network relay infrastructure (not shown) of the wireless network 101 which receives and routes wireless data packets to and from the mobile communication devices 201. The service UID is typically of the form "Sn" where the n represents a decimal number. The service UID also sometimes referred to as the Server Routing Protocol (SRP) Identifier. Each service UID is accompanied with an SRP authentication key which is required to authenticate the SRP connection of a mobile data server 120 to a relay server (not shown) of the wireless network relay infrastructure.

To activate the wireless services for a new user who does not have an existing mobile communication device 201, an IT administrator "adds" a user account for the new user to the user records of the respective mobile data server 120 using an administration tool. This may comprise creating a user account in the configuration database 126 maintained by the mobile data server 120, and associating a user mailbox in the mailbox database 133 with the user account created in the configuration database 126 maintained by the mobile data server 120, or both. This step may involve creating a user mailbox in the mailbox database 133. Where the user account data is stored typically depends on the messaging server 132 which is used, for example, whether a Microsoft Exchange™ IBM Lotus Domino™, or Novell GroupWise™ messaging server is used. Each user account contains a user account profile which specifies, among other things, the services that the device user is to have access to. The services available for a device user is typically set by the IT administrator and may change over time as services are added and/or removed. However, all user account information may not be stored on a per-user basis. Rather than a per-user basis, some user information (such as IT policy data) may be assigned to a user, a number of users or a user group. IT policy attributes can be assigned to a variety of "containers", for example, some policies might be assigned to a group or group(s) of which a user is a member. IT policy data for a given user may then be dynamically computed based on the user's current group memberships. Thus, some of the user profile data items may be computed/collated from other locations in the configuration database 126 rather than being stored explicitly on a per-user basis (e.g. within the user account profile).

The addition of a user account effectively tells the mobile data server 120 that it is to provide wireless services to the user via the user account; however, the mobile data server 120 cannot provide any services yet as it does not know what mobile communication device 201 is associated with the user account. In this state, the user account has been added to the mobile data server records, but there is no activated mobile communication device 201. The mobile data server 120 cannot do anything further until a mobile communication device 201 is activated for the user account.

The mobile communication device 201 may be activated through a physical or logical cable connection (typically a serial or USB connection) to a computer 117 which is securely connected to the mobile data server 120. This process is referred to as "wireline activation". In some implementations, the information which is transferred between the mobile communication device 201 and the mobile data server 120 through the wireline connection is assumed to be trustworthy and secured for activation purposes. Accordingly, no activation password is required for a wireline activation operation in some embodiments. In other embodiments, in either enterprise or public implementations, an activation password and/or other security mechanisms may be implemented to provide an additional layer of security. In some embodiments, a Bluetooth® or other PAN connection to the computer 117 may be used for exchanging activation information rather than a wireline connection. Activation may also occur wirelessly; however, wireless activation is not the subject of the present disclosure and will not be described herein.

Referring again to FIG. 7, in the first step 702 of the activation process 700 the mobile communication device 201 is connected to a computer 117 having Internet access using a communication protocol comprising a USB, serial or Bluetooth® connection. As noted above, this data path is generally considered to be secure for activation purposes.

Next, in step 704 the Web-based device management application 302 is launched on the computer 117. It assumed that the necessary communication components (i.e., the SC device controller 311, the device manager 314 and device drivers 316) are installed on the computer 117. If the communication components are not installed on the computer 117 or are out of date, the communication components are (re) installed on the computer 117. The SC device controller 311 (e.g., ActiveX control or plug-in) is invoked (launched) as a part of this step. In some embodiments, the functionality of activation process may be provided by an ActiveX control or browser plug-in or other SC device controller 311.

Next, in step 706 wireline activation is triggered. The trigger is typically an explicit request from the end user via the user interface of the Web-based device management application 302 but could be an implicit gesture via the user interface.

Next, in step 708 the SC device controller 311 reads the device capability data from the mobile communication device 201. The device capability data describes the software capabilities of the device 201 such as the character encoding formats/languages supported. In some embodiments, the device capability data comprises one or more of:

information regarding whether the device supports Secure/Multipurpose Internet Mail Extensions (S/MIME);

information regarding whether the device supports wireless folder management;

information regarding whether the device supports wireless calendar;

the cryptographic algorithms supported by device for device/server communications;

the character set encoding supported by device (UTF-8/UTF-16/ISO-8859-1) for the "traditional" service types (CMIME/CICAL/ALP/SYNC);

information regarding whether the device supports wireless application delivery;

information regarding whether the device supports application control policies;

information regarding whether the device can be reached via a wireless network relay infrastructure;

the service book level supported by device;

the maximum upload message size supported by device;

the maximum download message size supported by device;

the device application version;

the device model;

the device hardware identifier;

the device operating system version;

the device branding identifier;

the device network type;

information regarding whether the device supports "rich content" (e.g. HTML email);

information regarding whether the device supports context-based compression;

the services types for which device supports multiple instances;

information regarding whether the device supports synchronization of personal distribution lists;

information regarding whether the device supports "flags for follow-up"; and information regarding whether the device supports server-provided browser configuration data.

The device PIN is also obtained from the mobile communication device 201 by the SC device controller 311. The SC device controller 311 then transmits the device capability data and device PIN to the Internet browser 310 via its JavaScript engine. The Internet browser 310 then transmits the device capability data and device PIN to the mobile data administration server 122. The mobile data administration server 122 then transmits the device capability data and device PIN to the mobile data server 120.

Next, in step 710 the mobile data server 120 persists the device PIN and the device capability data, and associates this information with the respective user account in mobile data server records. The device PIN and the device capability data are stored in the configuration database 106, and in some embodiments, the user's mailbox in the mailbox database 133 depending on the messaging server 132 which is used, for example, whether a Microsoft Exchange™ IBM Lotus Domino™, or Novell GroupWise™ messaging server is used.

Next, in step 712 the mobile data server 120 generates a private encryption key for the user account and places it in a "pending" state. The private encryption key is an encryption key which is shared between the mobile data server 120 and the mobile communication device 201 for encrypting and decrypting data exchanged between them. In some embodiments, the private encryption key may be an AES or Triple DES encryption key.

Next, in step 714 the mobile data administration server 122 generates service book records which comprise the service data which encodes the services that are available for the user account. The services that are available for the user account are determined by analyzing the user account profile maintained by the mobile data server 120, the device capabilities (from the device capability data or "device code version"), administrator defined IT policies (which allow services supported by the mobile data server 120 to be enable (activated) or disabled (deactivated) for a given user, user group, or enterprise), and possibly server side settings. Server side settings are administrator defined settings of the mobile data server 120, typically globally defined for all devices 201, which control the behaviour or configuration of the mobile data server 120. An example of a server side setting is whether rich text email is used by the mobile communication devices 201. While the user account profile describes the services that are available for a user account, service book creation is fine tuned using the device capabilities and IT policies applicable to the user account of a given user so that service records typically only comprise service records for services supported by the device 201 (by analysing the device capability data) and only services provided by the mobile data server 120 which the user account is to have access (by analysing the IT policy data). The service book records include the service UID (the normal routing address) of the respective mobile data server 120. In other embodiments, the service book records may be generated by the mobile data server 120 rather than mobile data administration server 122.

Next, in step 716 the mobile data server 120 transmits the private encryption key, IT policy data (typically comprising one or more IT policy messages) associated with the user account, and possibly the service book records (if generated by the mobile data server 120) to the mobile data administration server 122. The IT policy data is defined for the user account based on settings/parameters specified by the IT administrator and stored in the configuration database 126. The mobile data administration server 122 then transmits this information to the Internet browser 310 of the computer 117 via the JavaScript Engine. The Internet Browser 310 then transmits this information to the SC device controller 311.

Next, in step 718 the SC device controller 311 stores the service book records, the private encryption key, and IT policy data associated with the user account to the mobile communication device 201 in memory, for example, in the flash memory 244. Typically, IT policy data is stored prior to the service records so that the service records aren't provided to it without an IT policy already present on the mobile communication device 201. It is possible that the IT policy data could influence the behaviour of the mobile communication device 201 in terms of which service books it is willing to accept or operate with.

Next, in step 720 if the service book records, the private encryption key, and IT policy data were successfully stored on the mobile communication device 201, an acknowledgement message that this information was successfully stored on the device 201 is sent from the mobile communication device 201 to the SC device controller 311. The SC device controller 311 then transmits the acknowledgement message (or a notification that it has been received) to the Internet browser 310 via its JavaScript Engine. The Internet browser 310 then transmits it to the mobile data administration server 122 which, in turn, transmits this information to the mobile data server 120.

Next, in step 722 when the mobile data server 120 receives an acknowledgement that the service book records, the private encryption key, and IT policy data associated with the user account have been stored on the mobile communication device 201, the mobile data server 120 promotes the private encryption key from the "pending state" to a "current" or "active" state and begins wireless service for the mobile communication device 201. If no acknowledgement is received, the private encryption key remains in the "pending" state. In some embodiments, the service book records and/or the private encryption key may be wiped (deleted) by the mobile data server 120 if an acknowledgement is not received within a predetermined duration.

After the mobile communication device 201 has been successfully activated, sufficient information has been exchanged for regular wireless service to be established between the mobile data server 120 and the mobile communication device 201. In particular, after activation is completed the following data has been exchanged:
  (1) the mobile data server 120 knows the device PIN which is associated with user account. The mobile data server 120 addresses data to the mobile communication device 201 by specifying the device PIN;
  (2) the device knows the service UID associated with the mobile data server 120 which is effectively a server-side routing destination to which the mobile communication device 201 can route data. The mobile communication device 201 addresses data that is to be sent to a particular mobile data server 120 by specifying this service UID;
  (3) the mobile communication device 201 has knowledge of what services the mobile data server 120 can provide. This was communicated from the mobile data server 120 through the information in the service book records;
  (4) IT policy information defined by the IT administrator has been installed on the mobile communication device 201. This information was encoded in the IT policy data (e.g. IT policy data messages);
  (5) the mobile data server 120 has knowledge about the capabilities of the mobile communication device 201; and
  (6) the shared private encryption key that was generated by the mobile data server 120. The private encryption key is typically included with the service book record data.

Activation may be required again when any of the information exchanged during activation is changed. This process is referred to as (re)activation. In some embodiments, reactivation may occur wirelessly over-the-air (OTA) in some cases, for example, when server the server-side information changes. The shared encryption context can be used to send the updated service records to the mobile communication device 201 and/or send device capability data to mobile data server 120 the wirelessly. Depending on the type of event, some information relating to activation may be maintained on the mobile communication device 201 in which case the maintained data is typically overwritten during (re)activation. For example, any of the following events effectively typically require activation to be repeated:
  (1) the device user seeks to use a new (different) mobile data server 120—the mobile communication device 201 needs the new service routing data (i.e. the service UID) of the new mobile data server 120—this is effectively a new activation on the new mobile data server;
  (2) the mobile data server 120 is upgraded to have new services or capabilities about which the mobile communication device 201 requires service data—as noted above, in some embodiments reactivation may occur wirelessly over-the-air (OTA) when server data information changes;
  (3) the device user switches to a new (different) mobile communication device 201—the mobile data server 120 needs to know the device PIN and capabilities of the new mobile communication device 201, and the IT policy data and private encryption key must be established on the new mobile communication device 201—this is effectively a new activation of the new mobile communication device 201 on the existing mobile data server 120; and
  (4) when device software is upgraded or the device software is erased (e.g. during a device wipe—a data security action)—the mobile communication device 201 may obtain have new capabilities of which the mobile data server 120 needs to be informed. A device software upgrade or device wipe also purges the private encryption key and so the private encryption key must be re-established on the mobile communication device 201. In some embodiments, IT policy data may be maintained over a software upgrade. If the private encryption key and service data is preserved and the device capabilities do not change, a device software upgrade/load may not require a reactivation.

Referring now to FIG. 8, the communications exchange between during a wireline activation in accordance with one embodiment of the present disclosure will be described. From a user interface (UI) perspective, wireline activation may appear to be a simple, single-click action. However, the communications exchange required to provided this seamless experience for the web-client based end user involves two server-side calls, and interleaved with two device communication operations. The JavaScript code in the DHTML page is the component with access to both the mobile communication device 201 and the mobile data server 120 and controls the overall activation process.

First, in step 802 the JavaScript code of the DHTML page requests the device PIN and device capability data from the mobile communication device 201 which is to be activated.

Next, in step 804 the SC device controller 311 (e.g., ActiveX control or plug-in) retrieves the device PIN and the device capability data from the mobile communication device 201.

Next, in step 806 the JavaScript Engine, which is running the JavaScript of the DHTML page, receives the device capability data and PIN from the SC device controller 311.

Next, in step 808 the JavaScript Engine makes a remote procedure call (RPC) to the mobile data server 120 providing the device capability data and the device PIN. The RPC call is sent to the Web server 121 which acts as front end for the wireline activation process.

Next, in step 810 on receiving the RPC call the Web server 121 makes the appropriate call to the mobile data administration server 122 to begin a wireline activation.

Next, in step 812 the mobile data administration server 122 makes the necessary RPC call to a mobile data server 120 which persists the device capability data and device PIN. The mobile data server 120 stores the device capability data and device PIN in the configuration database 126 and possibly corresponding user mailbox of the mailbox database 133, depending the messaging server 132. The mobile data server 120 also generates a private encryption key and places the private encryption into a "pending" state.

Next, in step 814 the mobile data server 120 stores the encryption key in the configuration database 126 in association with the corresponding user account, and possibly the corresponding user mailbox of the mailbox database 133 depending on the messaging server 132 which is used.

Next, in step 816 the mobile data administration server 122 retrieves the necessary data (e.g. user account data from user account profile, device capabilities, administrator-defined IT policies and server side settings) from the configuration database 126 and generates service book data packets for the mobile communication device 201. The mobile data administration server 122 also constructs IT policy data packets from IT policy data defined for the user for delivery to the mobile communication device 201. The mobile data administration server 122 also retrieves the private encryption key from the configuration database 126 (or possibly the mailbox database 133).

Next, in step 818 the service book records, private encryption key, and IT policy data is sent to the Web server 121.

Next, in step 820 the Web server 121 sends the service book, private encryption key, and IT policy data to the Internet Browser 310 on the computer 117 via the JavaScript Engine.

Next, in step 822 the Internet Browser 310 via the JavaScript Engine calls the SC device controller 311 with the service book records, private encryption key, and IT policy data, and requests that this information be stored on the mobile communication device 201.

Next, in step 824 the SC device controller 311 stores the service book records, private encryption key, and IT policy data on the mobile communication device 201. As noted above, the IT policy data is typically stored first and before the service books.

Next, in step 826 upon receiving an acknowledgment from the SC device controller 311 that the service book records, private encryption key, and IT policy data were successfully stored on the mobile communication device 201, the Internet Browser 310 via its JavaScript Engine makes a second remote procedure call (RPC) to the mobile data server 120 indicating that the private encryption key was successfully stored/installed on the mobile communication device 201.

Next, in step 828 on receiving the RPC call the Web server 201 makes the appropriate call to the mobile data administration server 122 to complete the wireline activation.

Next, in step 830 the mobile data administration server 122 makes the necessary RPC call to the mobile data server 120 which promotes the "pending" private encryption key to the "current" or "active" state and commences services for the mobile communication device 201.

Although reference has been made to certain wireless network types and standards for the purpose of illustration, such as the IEEE 802.11x standards, it will be appreciated that the present disclosure is intended to cover all further revisions, supplements, additions and replacements to the referenced network types and standards, whether or not explicitly described above.

The foregoing detailed description of example embodiments of the present disclosure does not limit the implementation of the application to any particular computer programming language. The present disclosure may be implemented in any computer programming language provided that the operating system (OS) provides the facilities that may support the requirements of the present disclosure. An embodiment is implemented in the Java™ computer programming language (or other computer programming languages such as C or C++). (Java and all Java-based trademarks are the trademarks of Sun Microsystems Corporation.) Any limitations presented would be a result of a particular type of operating system or computer programming language and would not be a limitation of the present disclosure.

While the present disclosure is primarily described as a method, a person of ordinary skill in the art will understand that the present disclosure is also directed to apparatus such as a computer, mobile communication device, mobile data administration server, and mobile data server for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure. In addition, a communication system comprising an mobile data administration server, a mobile data server and a plurality of mobile communication devices connected via a wireless communication network, in which the communication system components are configured to implement at least some of the processes described herein, also comes within the scope of the present disclosure.

In accordance with one embodiment of the present disclosure, there is provided a method for communicating between a computer and an electronic device connected to the computer through a communications protocol, the computer being in communication with network resources via a communications network, the method comprising: displaying a web page including a scripting language within an Internet browser on the computer, the Internet browser including a scripting engine for executing the scripting language; providing a scripting-language capable device controller for interfacing communications between the scripting engine and the electronic device in accordance with the communications protocol connecting the computer and electronic device; receiving by the scripting-language capable device controller of first data from the electronic device through the communications protocol; sending the first data from the scripting-language capable device controller to the scripting engine of the Internet browser; and sending the first data from the Internet browser to a network server connected to the communication network.

In accordance with another embodiment of the present disclosure, there is provided a data processing system, comprising: a processor for controlling the operation of the data processing system; a display connected to the processor; a data interface connected to the processor and configured for communicating with an electronic device and for exchanging data with the electronic device through a communications protocol; a scripting-language capable device controller for interfacing communications from the scripting engine with the electronic device in accordance with the communications protocol; a communications subsystem for exchanging data with a communications network; an Internet browser including a scripting engine for executing a scripting language; a module for displaying a web page including a scripting language within an Internet browser on the computer, the Internet browser including a scripting engine for executing the scripting language; a module for providing a scripting-language capable device controller for interfacing communications between the scripting engine and the electronic device in accordance with the communications protocol connecting the computer and electronic device; a module for receiving by the scripting-language capable device controller of first data from the electronic device through the communications protocol; a module for sending the first data from the scripting-language capable device controller to the scripting engine of the Internet browser; and a module for sending the first data from the Internet browser to a network server connected to the communication network.

In accordance with a further embodiment of the present disclosure, there is provided a method for establishing a service relationship between a mobile communication device and a mobile data server for connecting to a wireless network, wherein the mobile communication device is connected to a computer through a communications protocol, the method comprising: displaying a web page including a scripting language within an Internet browser on the computer, the Internet browser including a scripting engine for executing the scripting language; providing a scripting-language capable device controller for interfacing communications between the scripting engine and the mobile communication device in accordance with the communications protocol connecting the computer and mobile communication device; receiving by the Internet browser of a first request to establish the service relationship between the mobile communication device and the mobile data server via a user interface element of the web page; receiving a device identifier and device capability data by the scripting-language capable device controller from the mobile communication device in response to the first request; sending the device identifier and device capability data from the scripting-language capable device controller to the scripting engine of the Internet browser; sending the device identifier and device capability data and the second request to establish the service relationship between the mobile communication device from the Internet browser to a mobile data administration server in communication with the computer via a communications network; receiving service data for the mobile communication device from the mobile data administration server by the Internet browser in response to the second request; sending the service data from the Internet browser to the scripting-language capable device controller; sending the service data from the scripting-language capable device controller to the mobile communication device through the communications protocol; and storing the service data in a memory of the mobile communication device.

In accordance with a further embodiment of the present disclosure, there is provided a data processing system, comprising: a processor for controlling the operation of the data processing system; a data interface connected to the processor and configured for communicating with a mobile communication device and for exchanging data with the mobile communication device through a communications protocol; an Internet browser including a scripting engine for executing a scripting language; a scripting-language capable device controller for interfacing communications from the scripting engine with the mobile communication device in accordance with the communications protocol; a communications subsystem for exchanging data with a communications network; a display connected to the processor for displaying a web page within a Internet browser instance; a module for receiving by the Internet browser of a first request to establish the service relationship between the mobile communication device and the mobile data server via a user interface element of the web page; a module for receiving a device identifier and device capability data by the scripting-language capable device controller from the mobile communication device in response to the first request; a module for sending the device identifier and device capability data from the scripting-language capable device controller to the scripting engine of the Internet browser; a module for sending the device identifier and device capability data and the first request to establish the service relationship between the mobile communication device from the Internet browser to a mobile data administration server in communication with the computer via a communications network; a module for receiving service data for the mobile communication device from the mobile data administration server by the Internet browser in response to the first request; a module for sending the service data from the Internet browser to the scripting-language capable device controller; a module for sending the service data from the scripting-language capable device controller to the mobile communication device through the communications protocol; and a module for storing the service data in a memory of the mobile communication device.

In accordance with a further embodiment of the present disclosure, there is provided a method for use by a server for establishing a service relationship between a mobile communication device and a mobile data server for connecting to a wireless network, wherein the mobile communication device is connected to a computer through a communications protocol, the method comprising: receiving device identifier and device capability data about a mobile communication device connected to the computer via a communications network connecting the server to the computer; generating service data for the mobile communication device in accordance with the device identifier and device capability data; sending the service data to the computer via the communications network; and commencing service to the mobile communication device when an acknowledgement message that the service data has been stored on the mobile communication device is received by the server.

In accordance with a further embodiment of the present disclosure, there is provided a server for establishing a service relationship between a mobile communication device and a mobile data server for connecting to a wireless network, wherein the mobile communication device is connected to a computer through a communications protocol, the server comprising: a module for receiving by a mobile data administration server of device identifier and device capability data about a mobile communication device connected to the computer via a communications network connecting the mobile data administration server to the computer; a module for generating service data for the mobile communication device in accordance with the device identifier and device capability data; a module for sending the service data to the computer via the communications network; and a module for commencing service to the mobile communication device when an acknowledgement message that the service data has been stored on the mobile communication device is received by the server.

In accordance with further embodiments of the present disclosure, there is provided apparatus such as a data processing system (e.g. computer and/or server) for implementing the methods described herein, a computer program product comprising a computer readable medium having stored thereon computer program instructions for implementing the methods described herein on a suitable data processing system, as well as a computer data signal having program instructions recorded therein for practising the methods of the present disclosure on a suitable data processing system.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method for upgrading device software on an electronic device connected to a computer through a communications protocol, the computer being connected to a central repository of device software over a communications network, the method comprising:
displaying a web page including a scripting language within an Internet browser on the computer, the Internet browser including a scripting engine for executing the scripting language;
providing a scripting-language capable device controller for interfacing communications between the scripting engine and the electronic device in accordance with the communications protocol connecting the computer and electronic device;
receiving by the Internet browser of a request to install device software onto the electronic device via a user interface element of the web page;
receiving by the scripting-language capable device controller of device attribute information from the electronic device through the communications protocol in response to the request;
sending the device attribute information from the scripting-language capable device controller to the scripting engine of the Internet browser;
sending the device attribute information from the Internet browser;
determining whether an upgrade is permitted in accordance with a policy rule restricting software upgrades stored in a memory of the electronic device;
when an upgrade is available and required by a forced upgrade policy, determining whether an upgrade deferral is available;
requesting input whether to perform the upgrade when an update deferral is available;
performing the upgrade when input to perform the upgrade is received; and
deferring the upgrade and incrementing the number of upgrade deferrals taken when input not to perform the upgrade is received; and
when an upgrade is permitted in accordance with a policy rule restricting software upgrades or required by the forced upgrade policy and when an upgrade is available, receiving upgrade software for the electronic device in response to the sending the device attribute information, and upgrading device software on the electronic device using the upgrade software using the communications protocol connecting the computer and electronic device.

2. The method of claim 1, wherein the upgrading comprises storing the upgrade software on the electronic device through the communications protocol.

3. The method of claim 2, wherein the upgrading comprises downloading the upgrade software to the computer from a server or a storage connected to the server, and copying the upgrade software from the computer to the electronic device through the communications protocol.

4. The method of claim 1, wherein the device software in the central repository comprises device software bundles comprising: a device operating system software which comprises a graphical user interface (GUI) for controlling the operation of the electronic device, radio code which configures a radio frequency (RF) based wireless communication system of the electronic device, and a Java Virtual Machine (JVM) for executing Java applications; and application software for providing applications on the electronic device.

5. The method of claim 1, further comprising:
determining, at a server, candidate device software for the electronic device in accordance with the device attribute information;
sending a list of candidate device software from the server to the computer via the Internet browser;
displaying the candidate device software within the Internet browser;
displaying a prompt for input selecting the device software for the upgrade; and
receiving an input selecting device software from the candidate software in association with input selecting device software for the upgrade;
wherein the upgrade software is selected from the candidate device software in accordance with the device attribute information and the input selecting device software for the upgrade.

6. The method of claim 1, wherein the upgrade software is selected from the candidate device software in accordance with a policy rule restricting software which can be installed on the electronic device.

7. The method of claim 1, wherein determining whether a software upgrade is available comprises a version comparison of the device software including:
determining a version of device software on the electronic device and a version of the device software in the central repository; and
comparing the version of the device software in the central repository to version of device software on the electronic device, wherein an upgrade is available when the version of the device software in the central repository is greater than the version of device software on the electronic device.

8. The method of claim 1, wherein the electronic device is a mobile communication device having a communications subsystem for exchanging data with a wireless communications network, and wherein the device attribute information comprises a device model identifier (ID) of the mobile communication device and a wireless network carrier identifier (ID) of the wireless communications network.

9. The method of claim 1, wherein the device attribute information comprises the technical capabilities of the electronic device.

10. The method of claim 1, further comprising:
   automatically performing the software upgrade when an upgrade is available and required by the force load policy, and when an upgrade deferral is unavailable.

11. The method of claim 1, further comprising:
   determining whether an upgrade deferral is available including, determining whether a number of deferrals remaining taken is greater than or equal to a maximum number of deferrals, wherein an upgrade deferral is available when the number of deferrals remaining taken is greater than or equal to the maximum number of deferrals.

12. The method of claim 1, wherein the device attribute information is sent from the Internet browser to a server in communication with the communications network, the method further comprising:
   receiving by the server of the device attribute information;
   determining by the server whether an upgrade is available for the electronic device in accordance with the device attribute information; and
   when an upgrade is available, selecting by the server of the upgrade software for the electronic device from the device software in the central repository in accordance with at least the device attribute information.

* * * * *